United States Patent
Inoue

(10) Patent No.: US 8,984,061 B2
(45) Date of Patent: Mar. 17, 2015

(54) CONFERENCING SYSTEM, SERVER, IMAGE DISPLAY METHOD, AND COMPUTER PROGRAM PRODUCT

(75) Inventor: Noboru Inoue, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 455 days.

(21) Appl. No.: 12/186,620

(22) Filed: Aug. 6, 2008

(65) Prior Publication Data

US 2009/0043846 A1  Feb. 12, 2009

(30) Foreign Application Priority Data

Aug. 7, 2007  (JP) .................................. 2007-205647

(51) Int. Cl.
| | |
|---|---|
| G06F 15/16 | (2006.01) |
| G10L 21/00 | (2013.01) |
| H04N 13/02 | (2006.01) |
| G06F 3/14 | (2006.01) |
| G09G 5/14 | (2006.01) |

(Continued)

(52) U.S. Cl.
CPC ............... *G06F 3/14* (2013.01); *G06F 3/1454* (2013.01); *G09G 5/14* (2013.01); *H04L 12/1822* (2013.01); *H04L 67/14* (2013.01); *H04L 67/148* (2013.01); *G06F 17/30905* (2013.01)
USPC .............................. 709/204; 704/214; 348/47

(58) Field of Classification Search
CPC ... G06F 17/30905; G06F 8/65; G06F 9/4443; H04N 1/00244; H04N 7/15; H04N 1/00344
USPC ................. 701/211, 209; 348/14.08; 345/2.3; 704/270; 358/302, 1.15; 382/56; 709/204
See application file for complete search history.

(56) References Cited

U.S. PATENT DOCUMENTS

| | | | | |
|---|---|---|---|---|
| 4,097,135 | A | * | 6/1978 | Castor .............................. 353/15 |
| 5,267,333 | A | * | 11/1993 | Aono et al. .................... 382/166 |

(Continued)

FOREIGN PATENT DOCUMENTS

| | | |
|---|---|---|
| CN | 1476242 | 2/2004 |
| DE | 60316388 | 6/2008 |

(Continued)

OTHER PUBLICATIONS

European Search Report, Nov. 2, 2010, issued in related Patent Application No. EP-08252634.

(Continued)

*Primary Examiner* — Arvin Eskandarnia
*Assistant Examiner* — Margishi Desai
(74) *Attorney, Agent, or Firm* — ALG Intellectual Property, LLC

(57) ABSTRACT

The conferencing system is composed of computers, a moderator's computer, and a projector connected on a network. The moderator's computer receives image data from the computers, and generates synthesized image data therefrom, which is transmitted to the projector for display of the synthesized image. The moderator's computer has the capability to switch the image being projected by the projector from the synthesized image to an image handled by one of the computers or by the moderator's computer. With such an arrangement, utilizing existing hardware resources it will be possible to display in a single split-screen display the images handled by the terminals connected on the network. Additionally, it will be possible to switch smoothly between on-screen displays, and to reduce the burden on the on-screen display operator in a networked conferencing system.

10 Claims, 16 Drawing Sheets

(51) Int. Cl.
*H04L 12/18* (2006.01)
*H04L 29/08* (2006.01)
*G06F 17/30* (2006.01)

(56) References Cited

U.S. PATENT DOCUMENTS

| | | | | |
|---|---|---|---|---|
| 5,353,074 | A * | 10/1994 | Jones et al. | 353/122 |
| 5,408,424 | A * | 4/1995 | Lo | 708/303 |
| 5,615,324 | A * | 3/1997 | Kuboyama | 345/441 |
| 5,715,516 | A * | 2/1998 | Howard et al. | 455/422.1 |
| 5,963,246 | A * | 10/1999 | Kato | 348/14.09 |
| 6,128,774 | A * | 10/2000 | Necula et al. | 717/146 |
| 6,567,176 | B1 * | 5/2003 | Jeyachandran et al. | 358/1.14 |
| 6,654,135 | B2 * | 11/2003 | Mitani | 358/1.15 |
| 6,717,607 | B1 * | 4/2004 | Lauper et al. | 348/14.08 |
| 6,745,160 | B1 * | 6/2004 | Gupta et al. | 703/14 |
| 7,006,575 | B2 * | 2/2006 | Yamaguchi et al. | 375/240.26 |
| 7,154,538 | B1 * | 12/2006 | Fukasawa et al. | 348/211.3 |
| 7,193,628 | B1 * | 3/2007 | Phillips et al. | 345/440 |
| 7,251,049 | B2 | 7/2007 | Kurokawa et al. | |
| 7,315,386 | B1 * | 1/2008 | Shiimori et al. | 358/1.15 |
| 7,545,736 | B2 * | 6/2009 | Dziong et al. | 370/217 |
| 7,580,876 | B1 * | 8/2009 | Phillips et al. | 705/36 R |
| 2001/0009013 | A1 | 7/2001 | Appleman et al. | |
| 2002/0036652 | A1 | 3/2002 | Masumoto et al. | 345/732 |
| 2002/0045266 | A1 | 4/2002 | Fenniri | |
| 2002/0046033 | A1* | 4/2002 | Ono et al. | 704/270 |
| 2002/0046207 | A1* | 4/2002 | Chino et al. | 707/3 |
| 2002/0062343 | A1 | 5/2002 | Appleman et al. | |
| 2002/0154699 | A1* | 10/2002 | Yamaguchi et al. | 375/240.25 |
| 2002/0170043 | A1* | 11/2002 | Bagley et al. | 717/153 |
| 2002/0175832 | A1 | 11/2002 | Mizusawa et al. | |
| 2003/0072429 | A1* | 4/2003 | Slobodin et al. | 379/202.01 |
| 2003/0222891 | A1* | 12/2003 | Okamoto | 345/646 |
| 2004/0012669 | A1* | 1/2004 | Drell et al. | 348/14.08 |
| 2004/0031063 | A1* | 2/2004 | Satoda | 725/143 |
| 2004/0130568 | A1 | 7/2004 | Nagano et al. | |
| 2004/0169722 | A1* | 9/2004 | Pena | 348/14.01 |
| 2004/0179591 | A1* | 9/2004 | Wenger et al. | 375/240.01 |
| 2004/0190445 | A1* | 9/2004 | Dziong et al. | 370/225 |
| 2004/0205131 | A1* | 10/2004 | Saruhashi et al. | 709/205 |
| 2004/0205818 | A1* | 10/2004 | Saruhashi et al. | 725/61 |
| 2004/0227811 | A1* | 11/2004 | Yoneda | 348/14.08 |
| 2005/0002412 | A1* | 1/2005 | Sagfors et al. | 370/437 |
| 2005/0078101 | A1* | 4/2005 | Shigeta | 345/204 |
| 2005/0114528 | A1* | 5/2005 | Suito | 709/228 |
| 2005/0151838 | A1* | 7/2005 | Fujita et al. | 348/39 |
| 2005/0169179 | A1* | 8/2005 | Antal et al. | 370/231 |
| 2005/0220016 | A1* | 10/2005 | Yasuie et al. | 370/230 |
| 2005/0237380 | A1* | 10/2005 | Kakii et al. | 348/14.12 |
| 2005/0240344 | A1* | 10/2005 | Tomita et al. | 701/211 |
| 2005/0262266 | A1* | 11/2005 | Wiberg et al. | 709/238 |
| 2005/0265255 | A1* | 12/2005 | Kodialam et al. | 370/252 |
| 2006/0176317 | A1* | 8/2006 | Tamaki et al. | 345/629 |
| 2006/0234659 | A1* | 10/2006 | Sakamoto | 455/151.1 |
| 2006/0255986 | A1* | 11/2006 | Takanezawa et al. | 341/67 |
| 2006/0266942 | A1* | 11/2006 | Ikeda | 250/334 |
| 2006/0291477 | A1* | 12/2006 | Croak et al. | 370/395.51 |
| 2007/0026886 | A1* | 2/2007 | Vincent | 455/522 |
| 2007/0044025 | A1* | 2/2007 | Sakamoto | 715/734 |
| 2007/0097098 | A1* | 5/2007 | Yoshino | 345/179 |
| 2007/0146798 | A1* | 6/2007 | Eto et al. | 358/302 |
| 2007/0196133 | A1* | 8/2007 | Kubo | 399/223 |
| 2007/0200727 | A1* | 8/2007 | Sakamoto | 340/825.25 |
| 2007/0206875 | A1* | 9/2007 | Ida et al. | 382/242 |
| 2007/0242813 | A1* | 10/2007 | Horikiri et al. | 379/93.21 |
| 2007/0263082 | A1* | 11/2007 | Tamaru et al. | 348/14.08 |
| 2008/0002818 | A1* | 1/2008 | Kashimoto | 379/202.01 |
| 2008/0036695 | A1* | 2/2008 | Murai et al. | 345/2.3 |
| 2008/0071533 | A1* | 3/2008 | Cave et al. | 704/235 |
| 2008/0172312 | A1* | 7/2008 | Synesiou et al. | 705/34 |
| 2008/0218584 | A1* | 9/2008 | Matsumoto et al. | 348/14.09 |
| 2008/0230604 | A1 | 9/2008 | Fong | |
| 2008/0267283 | A1* | 10/2008 | Smith et al. | 375/240.01 |
| 2009/0082958 | A1* | 3/2009 | Ishii et al. | 701/209 |
| 2010/0002250 | A1* | 1/2010 | Sakagami et al. | 358/1.14 |
| 2010/0095241 | A1 | 4/2010 | Nagano et al. | |

FOREIGN PATENT DOCUMENTS

| | | |
|---|---|---|
| EP | 1385336 | 1/2004 |
| JP | 08-286868 A | 11/1996 |
| JP | 10-164542 A | 6/1998 |
| JP | 2000-023149 A | 1/2000 |
| JP | 2001-313915 A | 11/2001 |
| JP | 2003-296052 A | 10/2003 |
| JP | 2004-032663 A | 1/2004 |
| JP | 2004-054134 | 2/2004 |
| JP | 2005-079913 A | 3/2005 |
| JP | 2007-081863 A | 3/2007 |

OTHER PUBLICATIONS

Final Office Action received in U.S. Appl. No. 13/246,627; Oct. 18, 2012.

Non Final Office Action received in U.S. Appl. No. 13/246,627; Dec. 29, 2011.

* cited by examiner

Fig.7

|  | Mon | Tue | Wed | Thu | Fri |
|---|---|---|---|---|---|
| 1st Period (10:00~11:00) | Instructor M | | | | |
| 2nd Period (11:00~12:00) | | | Instructor O | | |
| 3rd Period (13:00~14:00) | | Instructor N | | | |
| 4th Period (14:00~15:00) | | | Instructor P | Instructor Q | |

Fig.8A

|  | Mon | Tue | Wed | Thu | Fri |
|---|---|---|---|---|---|
| 1st Period (10:00~11:00) | Class 1 |  |  | Class 6 |  |
| 2nd Period (11:00~12:00) | Class 2 |  | Class 4 |  |  |
| 3rd Period (13:00~14:00) |  | Class 3 | Class 5 |  | Class 7 |
| 4th Period (14:00~15:00) |  |  |  |  |  |

Fig.8B

|  | Class 1 |
|---|---|
| 1 | Student A |
| 2 | Student B |
| 3 | Student C |
| 4 | ... |
| ... | ... |

|  | Class 2 |
|---|---|
| 1 | Student F |
| 2 | Student G |
| 3 | Student H |
| 4 | ... |
| ... | ... |

...

|  | Class 7 |
|---|---|
| 1 | ... |
| 2 | ... |
| 3 | ... |
| 4 | ... |
| ... | ... |

US 8,984,061 B2

CONFERENCING SYSTEM, SERVER, IMAGE DISPLAY METHOD, AND COMPUTER PROGRAM PRODUCT

CROSS-REFERENCE TO RELATED APPLICATIONS

The present application claims priority from Japanese application P2007-205647A filed on Aug. 7, 2007, the content of which is hereby incorporated by reference into this application.

BACKGROUND

1. Field of the Invention

The present invention relates to a conferencing system which includes a terminal, a server, and an image display device connected via a prescribed communication channel.

2. Description of the Related Art

Conferencing systems in which multiple PCs are hooked up to a projector have been developed in recent years. Such a conferencing system enables display screens of the multiple computers to be projected simultaneously through a split-screen display; this is useful in situations such as conferences or seminars where it is desired to carry out a discussion while visually comparing data stored on several different computers. Known technologies relating to such conferencing systems includes that disclosed in JP-A-2004-54134 for example.

The above Patent Cited Reference discloses a technology whereby screen capture images from a number of terminals connected on a network are combined by a projector and projected as a single split-screen display.

However, conferencing systems employing this kind of the projector require the use of a special projector, so if a user who already owns a conventional projector wishes to participate in such a conferencing system, this will require the purchase of a new special projector, at considerable expense to the user. Moreover, in cases where a user who is operating the projector wishes to modify the currently projected split-screen display, for example, in order to toggle one of the terminal screens shown in the split-screen display to the screen of another terminal which is not currently displayed, there can be considerable wait time until the projector creates and projects the new combined image. Additionally, in instances where a user who is operating the projector wishes to himself present an image for projection by the projector, it will be necessary to operate two devices, namely the projector plus a terminal, thus imposing a considerable operational burden on the user. These problems are not limited to conferencing systems that employ projectors, and are to common generally to conferencing systems in which on-screen displays of terminals are shown on display devices of various kinds.

With the foregoing in view, it is one object of the present invention to provide a conferencing system that, utilizing existing hardware resources, is able to display in a single split-screen display images that are handled by is terminals connected by a prescribed communication channel. It is another object to provide a conferencing system able to switch smoothly between on-screen displays. It is a further object to reduce the burden on the operator entailed by on-screen display in a conferencing system that employs a prescribed communication channel.

SUMMARY

The present invention is addressed to attaining the above and/or optional objects at least in part according to the following modes. An aspect of the conferencing system having a terminal, a server, and an image display device connected via a prescribed communication channel, wherein the terminal includes a first transmission unit that transmits to the server, via the prescribed communication channel, terminal image data representing an image handled by the terminal;

the server includes: a reception unit that receives the terminal image data transmitted from the terminal, an image synthesis unit that generates synthesized image data for the purpose of displaying a synthesized image which has been created by synthesizing the image represented by the received terminal image data with another image, and a second transmission unit that transmits the synthesized image data so generated as data for display to the image display device via the prescribed communication channel; and the image display device includes a display unit for receiving the data for display and displaying the data as an image In the conferencing system of the above design, the server generates synthesized image data for the purpose of displaying a synthesized image created by synthesizing an image represented by terminal image data received with another image, and transmits the synthesized image data to the image display device. Consequently, the image display device will be able to display a synthesized image simply by receiving and displaying the synthesized image data, thus making it possible for an existing image display device lacking any special split-screen display functionality to display images handled by terminals connected on a prescribed communication channel, in the form of single split-screen display. The expression "prescribed communication channel" is used herein in a broad sense to include not only various types of networks such as local area networks, wide area networks, the Internet and so on, but also communications units of various kinds, such as communications units having direct local connections between devices rather than network connections.

Besides the embodiment as a conferencing system described above, the present invention may also be embodied as a server for displaying images on an image processing device; an image display method for display of images by a computer; or a computer program for displaying images. The computer program may be recorded on a computer-readable storage medium. Recording media that can be used for this purpose include flexible disks, CD-ROM, DVD-ROM, magnetooptical disks, memory cards, hard disks, and other media.

BRIEF DESCRIPTION OF THE DRAWINGS

FIG. 7 is an illustration depicting a specific example of an hourly profile 33;

FIG. 8A is an illustration depicting a specific example of an hourly profile 83;

FIG. 8B is an illustration depicting a specific example of a class makeup profile 84;

DESCRIPTION OF THE PREFERRED EMBODIMENTS

The embodiments of the present invention will now be described.

Figure 1:
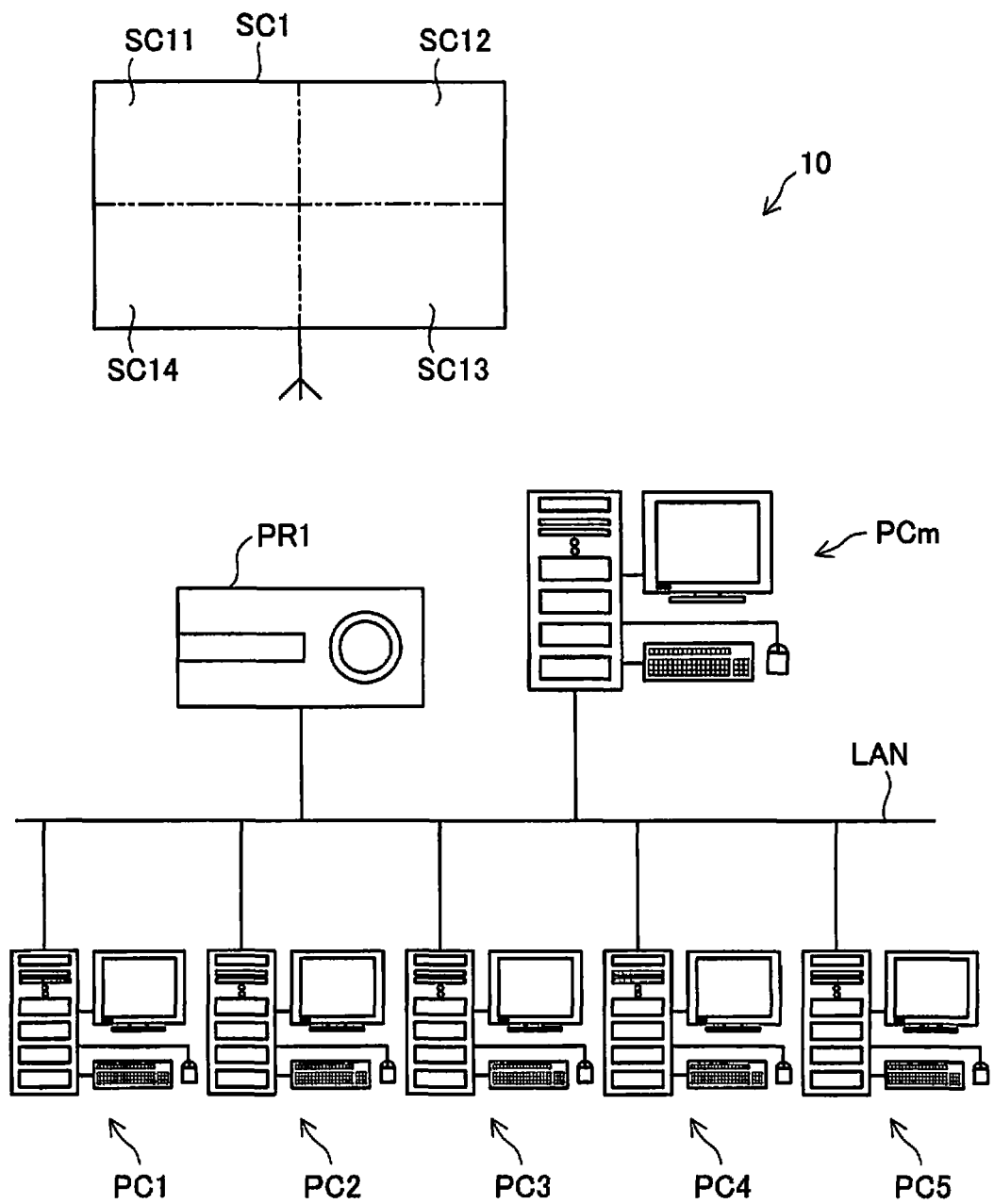
FIG. 1 is an illustration of a configuration of a conferencing system 10.

A. Configuration of Conferencing System 10:

A-1. General System Configuration:

A configuration for a conferencing system 10 according to this embodiment is depicted in FIG. 1. This conferencing system 10 is an image display system capable of simultaneous displaying by means of a projector an on-screen display of multiple terminals; the system includes computers PC1 through PC5, a moderator's computer PCm, and a projector PR1 which are connected on a prescribed communication channel. In this embodiment, the computers PC1 through PC5, the moderator's computer PCm, and the projector PR1 are connected on a local area network LAN. While not shown in the drawing, other devices equivalent to the moderator's computer PCm and the projector PR1 are installed on the local area network LAN as well.

The method of connection of the computers PC1 through PC5, the moderator's computer PCm, and the projector PR1 is not limited to the mode described above, and various other connection methods could be set up depending on the work environment, required communication speed, and other considerations. For example, there could be a local connection, such as a D-sub cable or USB cable connection, between the moderator's computer PCm and the projector PR1. Connections are not limited to wired connections, and wireless connections may be employed as well. Naturally, connections via the Internet would be possible as well.

While leaving a more detailed discussion for later, the projector PR1 is capable of displaying through projection onto a screen SC1 a synthesized image that has been created by the moderator's computer PCm synthesizing four different images into a single screen image. Herein, the four areas of the split-screen display on the screen SC1 will be denoted as split-screen areas SC11 through SC 14, as shown in the drawings.

Figure 2:
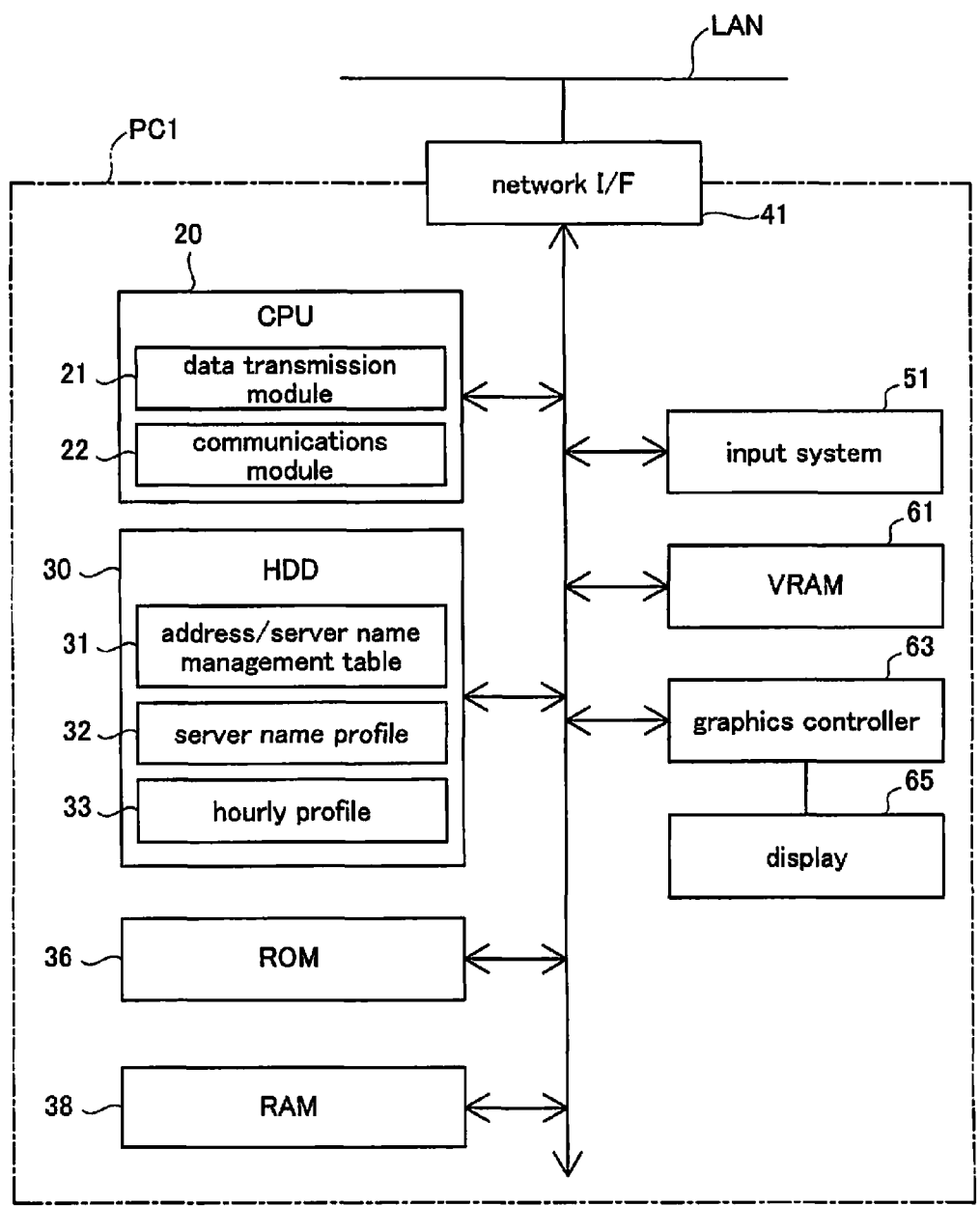
FIG. 2 is an illustration of a general configuration of computers PC1-PC5.

A-2. General Configuration of Computers PC1-PC5:

The computer PC1 in the conferencing system 10 is a personal computer on which prescribed programs have been installed, and is provided for use by a certain Student A. The general configuration of the computer PC1 is depicted in FIG. 2. Computers PC2 to PC5 which have been provided for use by Students B to E are comparable in configuration to the computer PC1 and as such need not be discussed here. As illustrated, the computer PC1 includes a CPU 20, a hard disk drive 30, a ROM 36, a RAM 38, a network interface 41, an input system 51, a VRAM 61, a graphics controller 63, and a display 65, which are respectively interconnected via a bus.

The CPU 20 performs control of the computer PC1 by loading into RAM 38 firmware or an OS which is stored on the hard disk drive 30 or in the ROM 36, and then executing it. Also, through execution of programs stored on the hard disk drive 30 the CPU 20 can function as a data transmission module 21 or as a communications module 22. These function modules will be discussed in detail later.

The hard disk drive 30 contains memory areas set aside for storing, in addition to the IP address of the computer PC1, an address/server name management table 31, a server name profile 32, and an hourly profile 83. These elements will be discussed in detail later. These memory areas are not limited to being provided on the hard disk drive 30, and may instead be set aside in EEPROM, a type of rewritable nonvolatile memory.

The network interface 41 constitutes the interface for connection to the local area network LAN; the computer PC1 is connected to the local area network LAN via this network interface 41.

The input system 51 includes a keyboard and a pointing device (a mouse in this example). The graphics controller 63, using the VRAM 61 as a buffer, displays images intended to be shown on the display 65.

Figure 3:
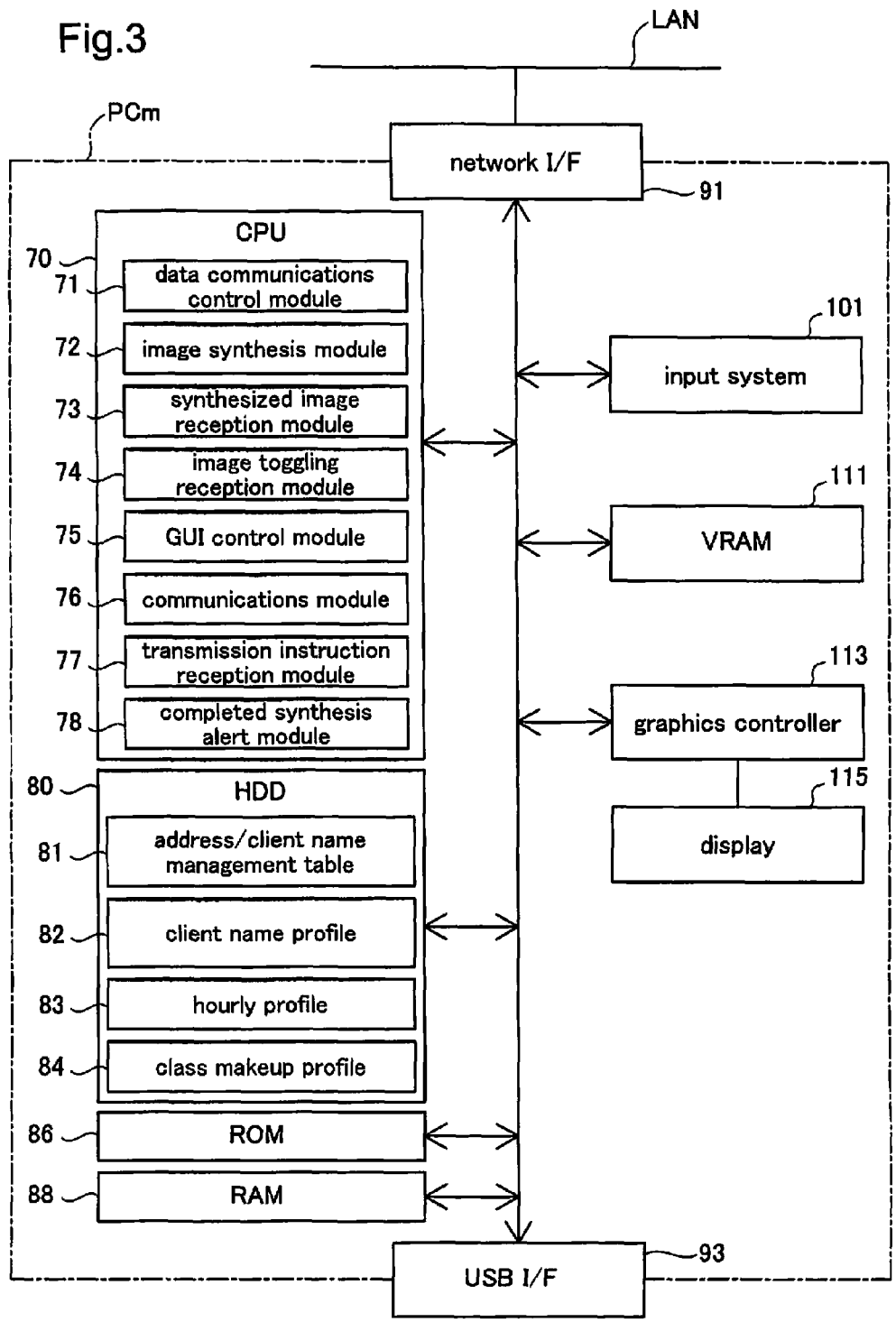
FIG. 3 is an illustration of a general configuration of a moderator's computer PCm.

A-3. General Configuration of Moderator's computer PCm:

The moderator's computer PCm in the conferencing system 10 is a personal computer on which prescribed programs have been installed, and is provided for use by an Instructor M. In the embodiment, this moderator's computer PCm corresponds to the element of the server in the claims. The general configuration of the moderator's computer PCm is depicted in FIG. 3. As illustrated, the moderator's computer PCm includes a CPU 70, a hard disk drive 80, a ROM 86, a RAM 88, a network interface 91, a USB interface 93, an input system 101, a VRAM 111, a graphics controller 113, and a display 115, which are respectively interconnected via a bus.

Through execution of programs stored on the hard disk drive 80, the CPU 70 can function as a data communications control module 71, an image synthesis module 72, a synthesized image reception module 73, an image toggling reception module 74, GUI control module 75, a communications module 76, a transmission instruction reception module 77, and a completed synthesis alert module 78. These function modules will be discussed in detail later. The transmission instruction reception module 77 and the completed synthesis alert module 78 are function modules provided in an alternative embodiment, described later.

The hard disk drive 80 contains memory areas set aside for storing, in addition to the IP address of the moderator's computer PCm, an address/client name management table 81, a client name profile 82, an hourly profile 83, and a class makeup profile 84. These elements will be discussed in detail later. A number of GUI programs, discussed later, are stored as well. These will be discussed in detail later. These memory areas are not limited to being provided on the hard disk drive 80, and may instead be set aside in EEPROM, a type of rewritable nonvolatile memory.

The USB interface 93 is a USB compliant interface for connection to the projector PR1, and the moderator's computer PCm is connectable to the projector PR1 with a USB cable.

The ROM 86, the RAM 88, the network interface 91, the input system 101, the VRAM 111, the graphics controller 113, and the display 115 are similar in design to those of the computers PC1-PC5, and need not be described in detail.

Figure 4:
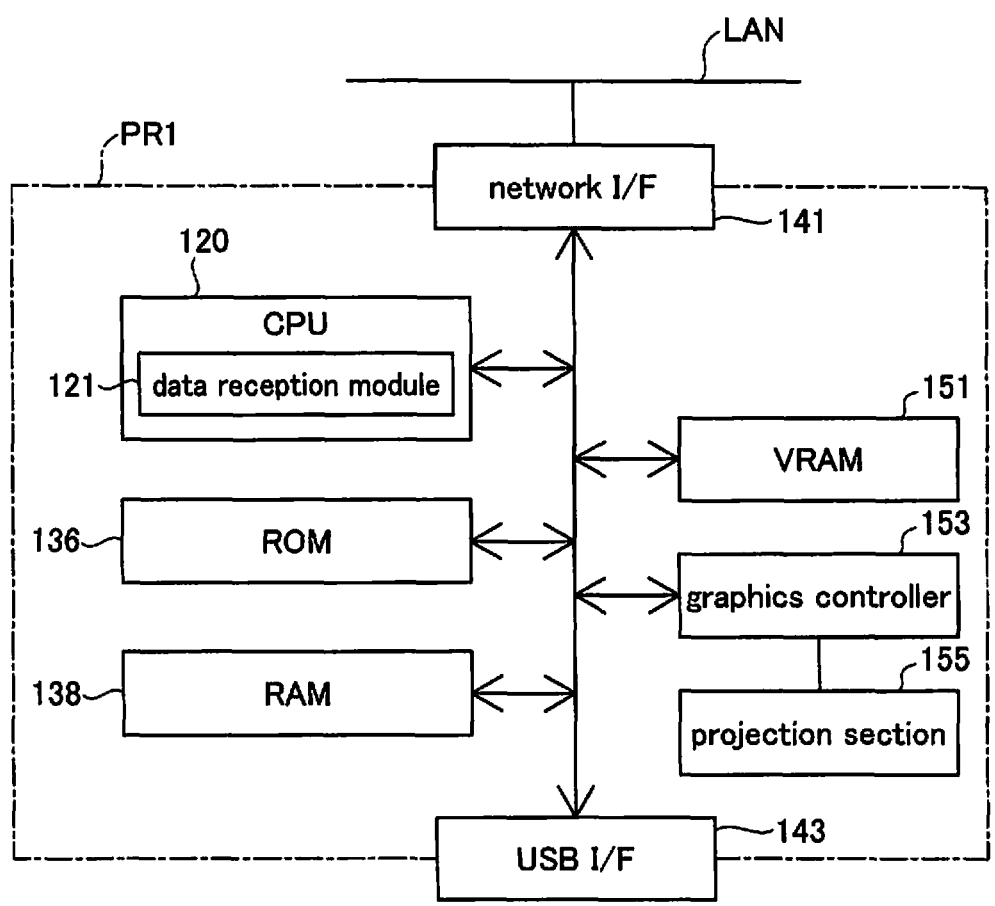
FIG. 4 is an illustration of a general configuration of a projector PR1.

A-4. General Configuration of Projector PR1:

The projector PR1 in the conferencing system 10 is a conventional projector lacking any special split-screen display capability; its general configuration is depicted in FIG. 4. As illustrated, the projector PR1 includes a CPU 120, a ROM 136, a RAM 138, a network interface 141, a USB interface 143, a VRAM 151, a graphics controller 153, and a projection section 155, which are respectively interconnected via a bus.

By loading a program stored in the ROM 136 into the RAM 38 and executing it, the CPU 120 can function as a data reception module 121. This function module will be discussed in detail later.

The network interface 141 is an interface for connection to the local area network LAN; the projector PR1 is connected to local area network LAN through this network interface 141. The USB interface 143 is a USB-compliant interface for connection to the moderator's computer PCm, and the projector PR1 is connectable to the moderator's computer PCm with a USB cable.

Using the VRAM 151 as a buffer, the graphics controller 153 controls the projection section 155 to project images. The projection section 155 is an LCD projection system that displays images on the screen SC1 by projecting light that has passed through liquid crystal panels for each of the RGB color components. While LCD technology is employed in this embodiment, no particular limitation to this technology is implied thereby, and it would be possible to use other technologies such as a CRT, DLP, LCOS, or GLV technology.

B. Method of Using Conferencing System 10:

The following specific discussion of the method of use of the conferencing system 10 envisions a conferencing system 10 adapted for use in a classroom. In the example below, it is assumed that in the course of the lesson the Instructor M in his or her capacity as the facilitator of the lesson will control the moderator's computer PCm, and via the projector PR1 will display on the screen SC1 in full-screen display any of the on-screen display images PCT1-PCT5 shown on the display 65 of each of the computers PCT1-PCT5 being used by the Students A-E, or the on-screen display image PCTm shown on the display 115 of the moderator's computer PCm; or a split-screen display that shows selected on-screen display images from among the on-screen display images PCT1-PTC5 and PCTm. The on-screen display images PCT1-PTC5 and PCTm are images that show data created respectively by the Students A-E and the Instructor M; depending on the circumstances of the lesson, the Students A-E and the Instructor M may take turns explaining the data they have individually created.

B-1. Initial Setup for Use:

Initial setup for the purpose of using the conferencing system 10 will now be described. Here, initial setup refers to the initial setup for the purpose of communication among the computers PC1-PC5 and the moderator's computer PCm.

The initial setup process is initiated when, first, the Instructor M launches a prescribed software application, and each Student A-E then launches the prescribed software application.

Once the aforementioned software application has started up, the CPU 20 of each of the computers PC1-PC5 will issue a search command for global broadcast onto the local area network LAN. Meanwhile, the CPU 70 of the moderator's computer PCm having received the search command will reply to each of the computers PC1-PC5 with the computer name (instructor name) and IP address of the moderator's computer PCm. The computers PC1-PC5, upon receipt of the computer name and IP address, will register the information in the address/server name management table 31.

The CPU 20 of each of the computers PC1-PC5 will then individually transmit the computer name (student name) and IP address of its s computer PC1-PC5 to the moderator's computer PCm. Upon receipt of these computer names and IP addresses, the moderator's computer PCm will register them in the address/client name management table 81.

Subsequently, through lookup in the server name profile 32 in which is registered the instructor's name and lookup in the aforementioned address/server name management table 31, the computers PC1-PC5 will identify the IP address of the moderator's computer PCm and establish communication. Similarly, through lookup in the client name profile 82 and in the address/client name management table 81, the moderator's computer PCm will identify the IP addresses of the computers PC1-PC5 and establish communication. In this embodiment, this initial setup process is designed to be carried out each time that aforementioned software application is launched in order to deal with instances in which a new student has been added or an IP address has changed; however, it is possible to dispense with this updating of initial setup in instances where there has been no change in registration over a prescribed time period. The initial setup process described above may also be designed to be input by the Instructor M and the Students A-E using the input systems 51 and 101.

In this embodiment, it has been assumed that the IP addresses of the computers PC1-PC5 and the moderator's computer PCm have been saved on the respective hard disk drives of the computers by being set beforehand by the Students A-E and the Instructor M; however, no particular limitation to such a mode is intended. For example, it would be acceptable, prior to the initial setup described above, for a DHCP server on the local area network LAN to receive IP address requests globally broadcast by the computers PC1-PC5 and by the moderator's computer PCm, and to individually assign IP addresses.

Figure 5:
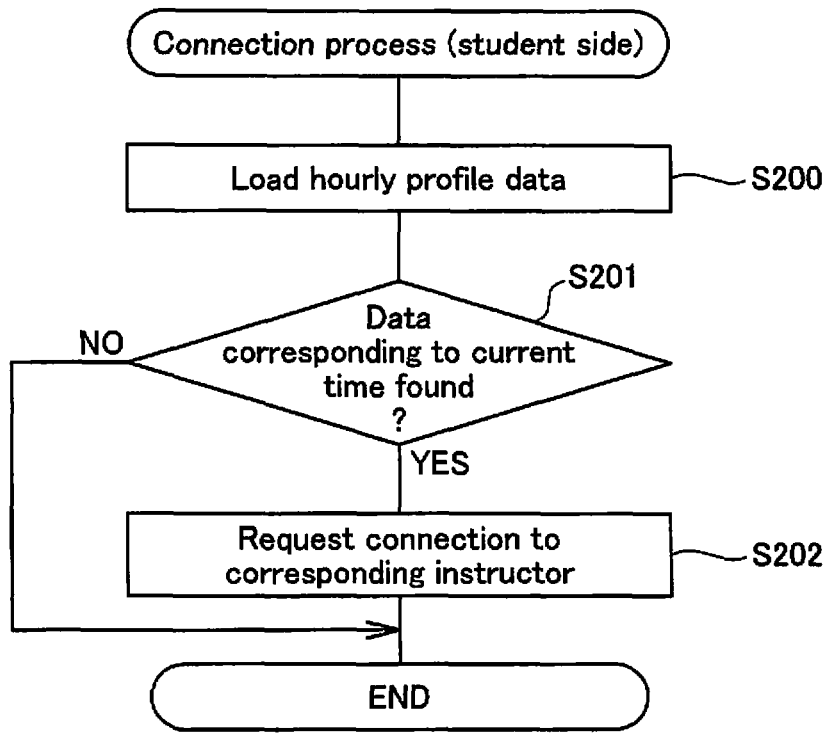
FIG. 5 is a flowchart depicting, in the connection process of the computers PC1-PC5 and the moderator's computer PCm, the flow on the computer PC1-PC5 side.
Figure 6:
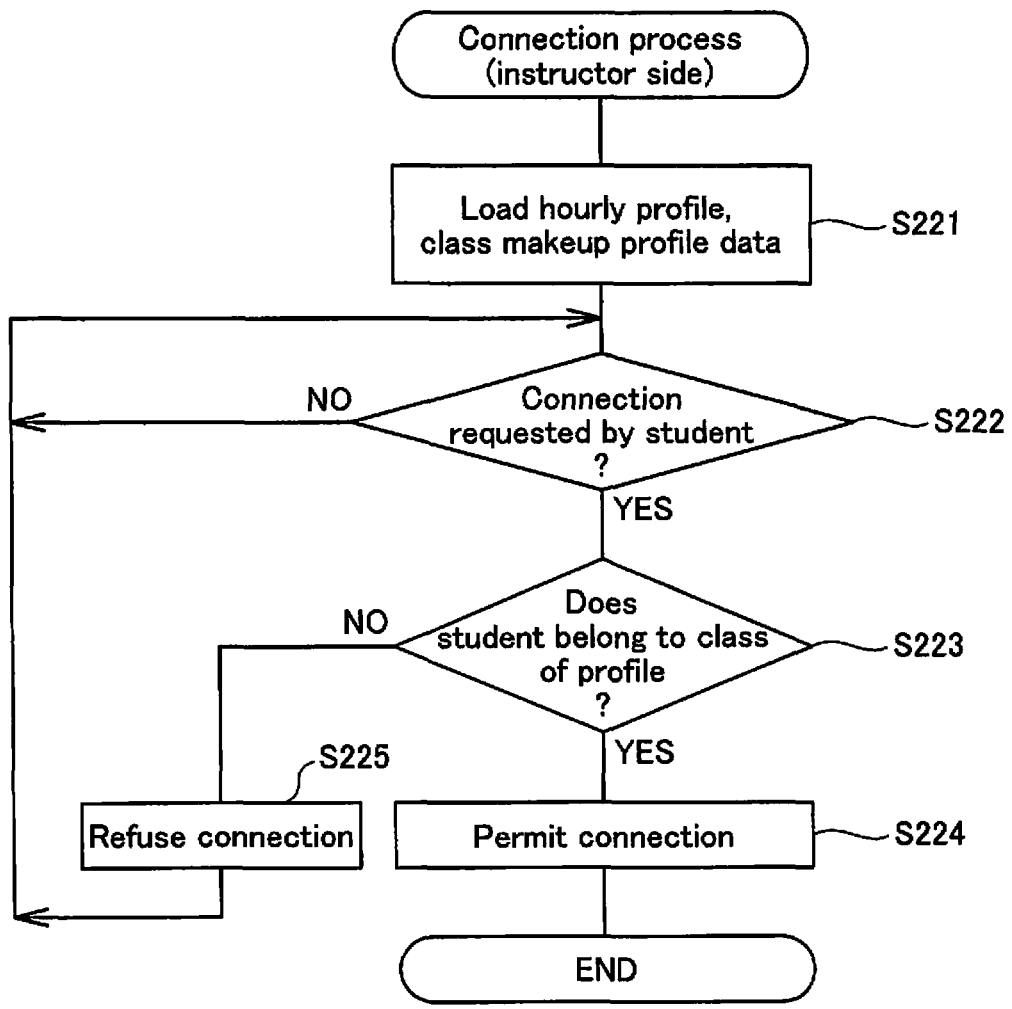
FIG. 6 is a flowchart depicting, in the connection process of the computers PC1-PC5 and the moderator's computer PCm, the flow on the moderator's computer PCm side.

B-2. Connection Process:

FIG. 5 and FIG. 6 depict the flow of the process establishing connections among the computers PC1-PC5 and the moderator's computer PCm. FIG. 5 depicts the process carried out on the computer PC1-PC5 side by the CPU 20 through a process in its capacity as the communications module 22. FIG. 6 s depicts the process carried out on the moderator's computer PCm side by the CPU 70 through a process in its capacity as the communications module 76. The description below assumes that the Students A-E have been assigned computers for their own exclusive use. These processes will be initiated upon launch of the aforementioned software application and completion of initial setup.

When the connection process is initiated, first the CPU 20 of each of the computers PC1-PC5 will load the hourly profile 33 stored on the hard disk drive 30, as depicted in FIG. 5 (Step S200).

A specific example of the hourly profile 33 is depicted in FIG. 7. The hourly profile 33 is a profile that establishes access points on a hourly basis; in this case, lesson time slots for first period Monday through Friday are associated with names of the instructors of the lessons taking place in those lesson time slots. That is, the hourly profile 33 represents a lesson schedule for the Students A-E, specifying for example that first period on Mondays will be taught by Instructor M, and that third period on Tuesdays will be taught by Instructor N. This hourly profile 33 will have been input beforehand by each Student A-E using the input system 51, and stored on the hard disk 30.

Once the hourly profile 33 has been loaded, the CPU 20 will compare the current time with the hourly profile 33 and decide whether there is any profile data corresponding to the current time (Step S201).

As a result, if there is corresponding profile data (Step S201: YES), this will mean that lesson attendance has been scheduled for the time in question, and the CPU 20 will accordingly request a connection to the computer (in this embodiment, the moderator's computer PCm) of the instructor in question (in this embodiment, Instructor M), at the time in question (Step S202). While not shown in FIG. 1, if like Instructor M, Instructors N to Q shown in FIG. 7 also have individually assigned moderator's computers that are connected to the local area network LAN, and if there are times at which other lessons have been scheduled, requests will be made to connect to the computers of Instructors N to Q. On the other hand, if there is no corresponding profile data (Step S201: NO), this will mean that no lesson has been scheduled for the time in question, and the process will terminate.

Meanwhile, when the connection process is initiated on the moderator's computer PCm end, first, as depicted in FIG. 6 the CPU 70 will load the hourly profile 83 and the class makeup profile 84 stored on the hard disk drive 80, as depicted in FIG. 6 (Step S221).

A specific example of this hourly profile 83 is depicted in FIG. 8A. The hourly profile 83 is a profile that establishes access points on a hourly basis; in this case, lesson time slots for first period to fourth period Monday through Friday are associated with the names of the lessons to be taught in those lesson time slots. That is, the hourly profile 83 represents a teaching schedule for Instructor M, specifying for example that he or she will teach Class 1 during first period on Mondays, and will teach Class 2 during second period on Mondays.

A specific example of the class makeup profile 84 is depicted in FIG. 8B. The class makeup profile 84 is a profile indicating the makeup of classes on an individual lecture attendance basis; here, the names of the students making up the class in question have been associated respectively with Class 1 to Class 7.

This hourly profile 83 and the class makeup profile 84 will have been input beforehand by Instructor M, and stored on the hard disk drive 80.

Once the hourly profile 83 and the class makeup profile 84 have been loaded, the CPU 70 will decide on an ongoing basis whether connection requests have been made by the Students A-E, i.e. by the computers PC1-PC5 (Step S222).

As a result, if no connection request has been made (Step S222: NO), it will await a connection request. If on the other hand it is decided that a connection request has been made (Step S222: YES), the CPU 70 will refer to the hourly profile 83 and to the class makeup profile 84 in order to decide whether the student making the connection request is a student belonging to the class that corresponds to the current time specified in the hourly profile 83 (Step S223).

As a result, if the student belongs to the class (Step S223: YES), the CPU 70 will allow connection in response to the connection request from the student, and a connection will be set up (Step S224). If on the other hand the student does not belong to the class, since the student in question is not authorized to attend the lesson being held at this time, the CPU 70 will refuse the connection request from the student (Step S225), whereupon the process will return to the aforementioned Step S222 and await a new connection request from a student. In this way, connections between the computers PC1-PC5 and the moderator's computer PCm are set up via the local area network LAN.

While this embodiment assumes that Students A-E have each been assigned the computers PC1-PC5 for their own exclusive use, in instances where a single computer will be shared by more than one student, it would be possible to employ an arrangement whereby, prior to the aforementioned Step S200, the CPU 20 will prompt the student to enter his or her name, and in the aforementioned Step S202 will transmit the student's name, together with the connection request, to the moderator's computer PCm.

Moreover, whereas in this embodiment both the computers PC1-PC5 in their capacity as terminals, and the moderator's computer PCm in its capacity as the server, respectively store profiles that contain associations between temporal conditions and access points, it would also be acceptable to employ an arrangement in which such profiles are stored only by one or the other. Where profiles are stored only by the moderator's computer PCm, by employing an arrangement whereby the computers PC1-PC5 automatically globally broadcast connection requests onto the local area network LAN, the moderator's computer PCm will be able to look up in the hourly profile 83 and the class makeup profile 84, and allow connections only for the computers PC1-PC5 that match these profiles, thereby making it possible for connections between the computers PC1-PC5 and the moderator's computer PCm to be set up automatically.

Further, it would be acceptable to employ an arrangement whereby if the moderator's computer PCm refuses a connection in Step S225, the computer PC1 -PC5 that was refused the connection will be notified of the refused connection. By so doing, the Student A-E may rapidly be apprised that he or she is not authorized to attend the lesson in question.

Figure 9:
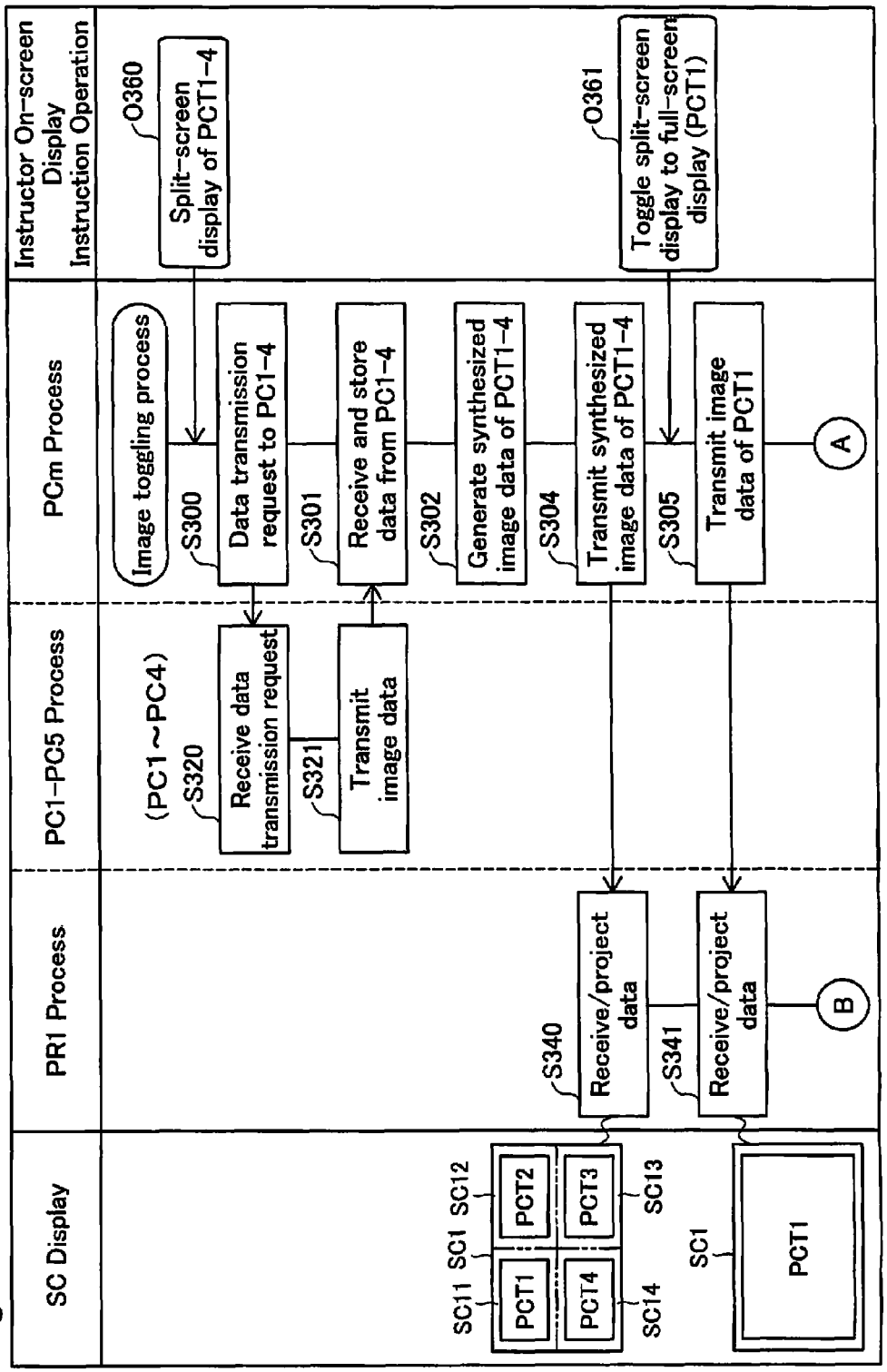
FIG. 9 is an illustration depicting by way of an embodiment an example of a flow of a split-screen display switching process for switching on-screen display using the conferencing system 10.
Figure 10:
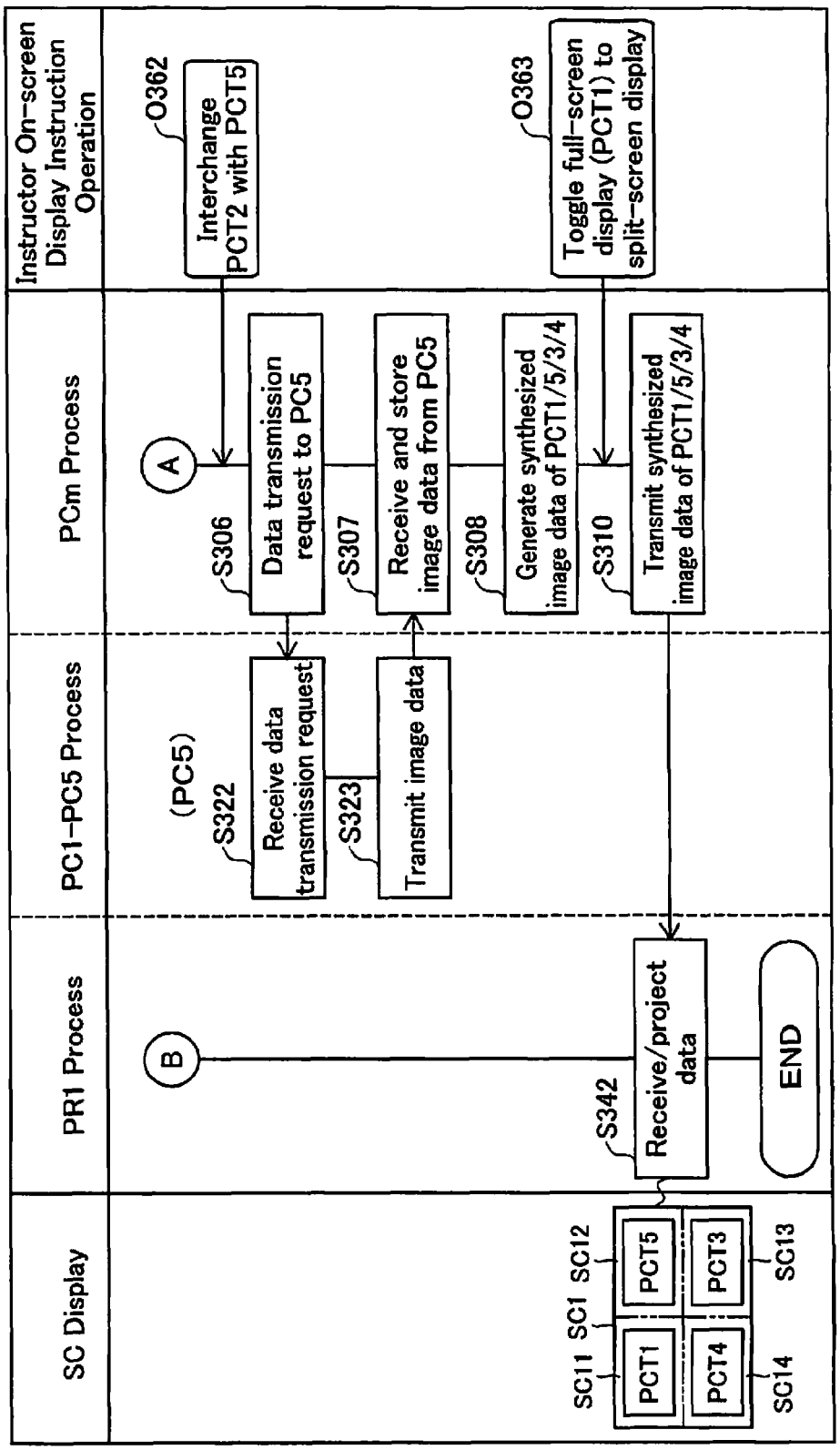
FIG. 10 is an illustration depicting by way of an embodiment an exemplary flow of a split-screen display switching process for switching on-screen display using the conferencing system 10.

B-3. Split-screen Display Switching Process:

FIG. 9 and FIG. 10 depict an exemplary flow of a split-screen display switching process in which the conferencing system 10 of the embodiment is used to project the on-screen displays of the computers PC1-PC5 onto the screen SC1 as a split-screen display image while switching among the on-screen displays. The right column in FIG. 9 and FIG. 10 depicts operations performed by the Instructor M using the moderator's computer PCm, to specify on-screen displays for projection onto the screen SC1. The middle columns in FIG. 9 and FIG. 10 depict processes of the moderator's computer PCm in response to the operations performed by the Instructor M shown in the right column, and processes of the computers PC1-PC5 and in the projector PR1 in response to the processes of the moderator's computer PCm. The left columns in FIG. 9 and FIG. 10 depict the images projected onto the screen at each stage of the processes shown in the middle columns.

This process will be initiated through a projected image instruction operation performed by the Instructor M on the moderator's computer PCm. In this embodiment, the instruction operation is one instructing the projector PR1 to project on-screen display images PCT1-PCT4 of the computers PC1-PC4, in the form of four split-screen images (Operation O360).

Figure 11:
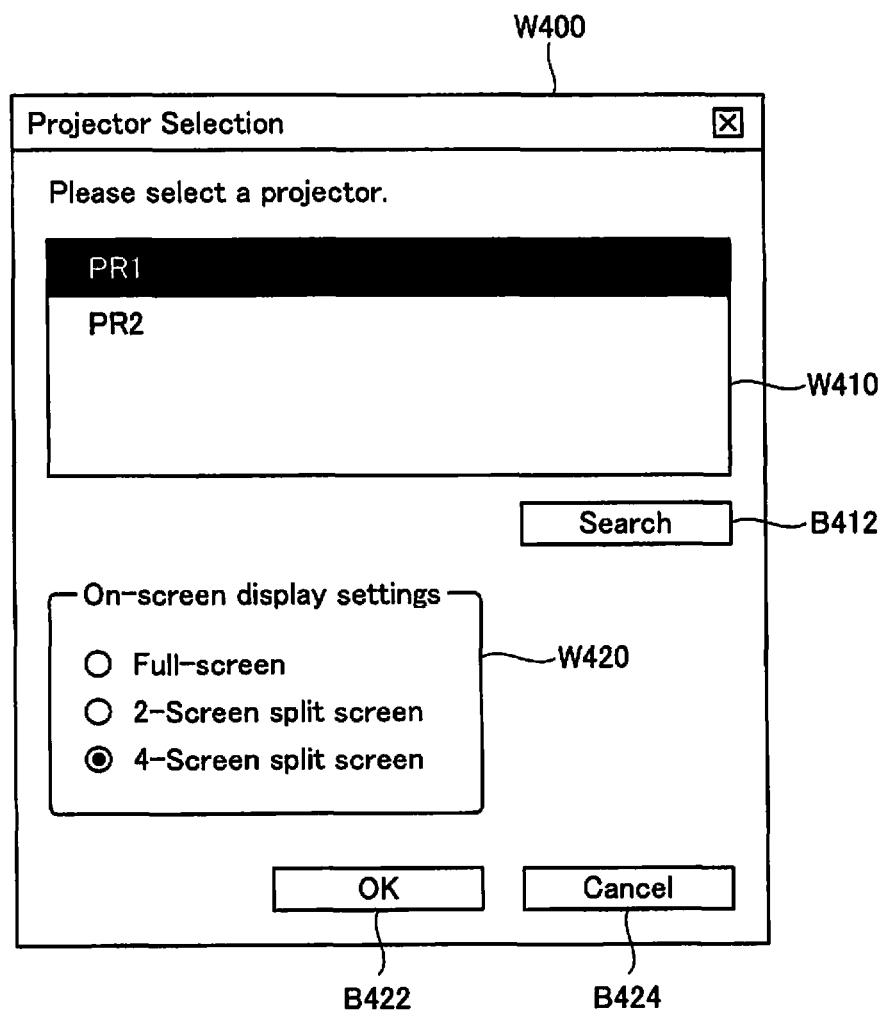
FIG. 11 is an illustration depicting an exemplary Projector Selection window W400 for making projector and on-screen display settings.

Operation O360 is specified using the input system 101, and a GUI (graphical user interface) that is displayed on the display 115 of the moderator's computer PCm. A specific example of the GUI is described below. On the moderator's computer PCm, when the aforementioned software application is launched, the CPU 70 will use the graphics controller 113 to bring up on the display 115 a window for selecting the projector and for making on-screen display settings. FIG. 11 depicts a Projector Selection window W400 as an example of such a window. The Projector Selection window W400 includes a projector selection sub-window 410 and an on-screen display settings sub-window W420.

The projector selection sub-window 410 displays a list of the projectors connected to the moderator's computer PCm. The projectors displayed here are projectors whose connection to the moderator's computer PCm have been recognized automatically through plug-and-play. FIG. 11 is depicts the projector PR1 selected as the projector for use from among the connected projectors PR1 and PR2. While not shown in FIG. 1, for the purposes of this example the projector PR2 is assumed to be connected on the local area network LAN through a configuration similar to the projector PR1. If a projector is located on the local area network LAN, the aforementioned list of projectors in the projector selection sub-window 410 will show the results of a search by the CPU 70 for projectors when the software application is launched; however, by clicking on a Search button B412 it will be possible to search again for connected projectors.

The on-screen display settings sub-window W420 shows display options for images to be displayed on the screen SC1 by the projector PR1. In the example of FIG. 11, the options are full screen display, two-screen display, and four-screen display; of these, the four-screen display option is depicted as having been selected. Two-screen display and four-screen display represent display options whereby different images will be displayed simultaneously in split-screen display. By selecting from among these display modes it is a simple matter to switch between split-screen display and full-screen display; a detailed discussion will follow later. The options for split-screen display are not limited to two-screen display and four-screen display shown here by way of example; naturally, a three-screen display, or a display of five or more screens, would be acceptable as well. An arrangement that further enables selection of various split-screen display modes during 2-screen display, such as the placement of split screens (i.e. whether the two screens will be displayed arrayed horizontally or the two screens will be displayed arrayed vertically) or the sizing of individual split screens, would be acceptable as well.

Figure 12:
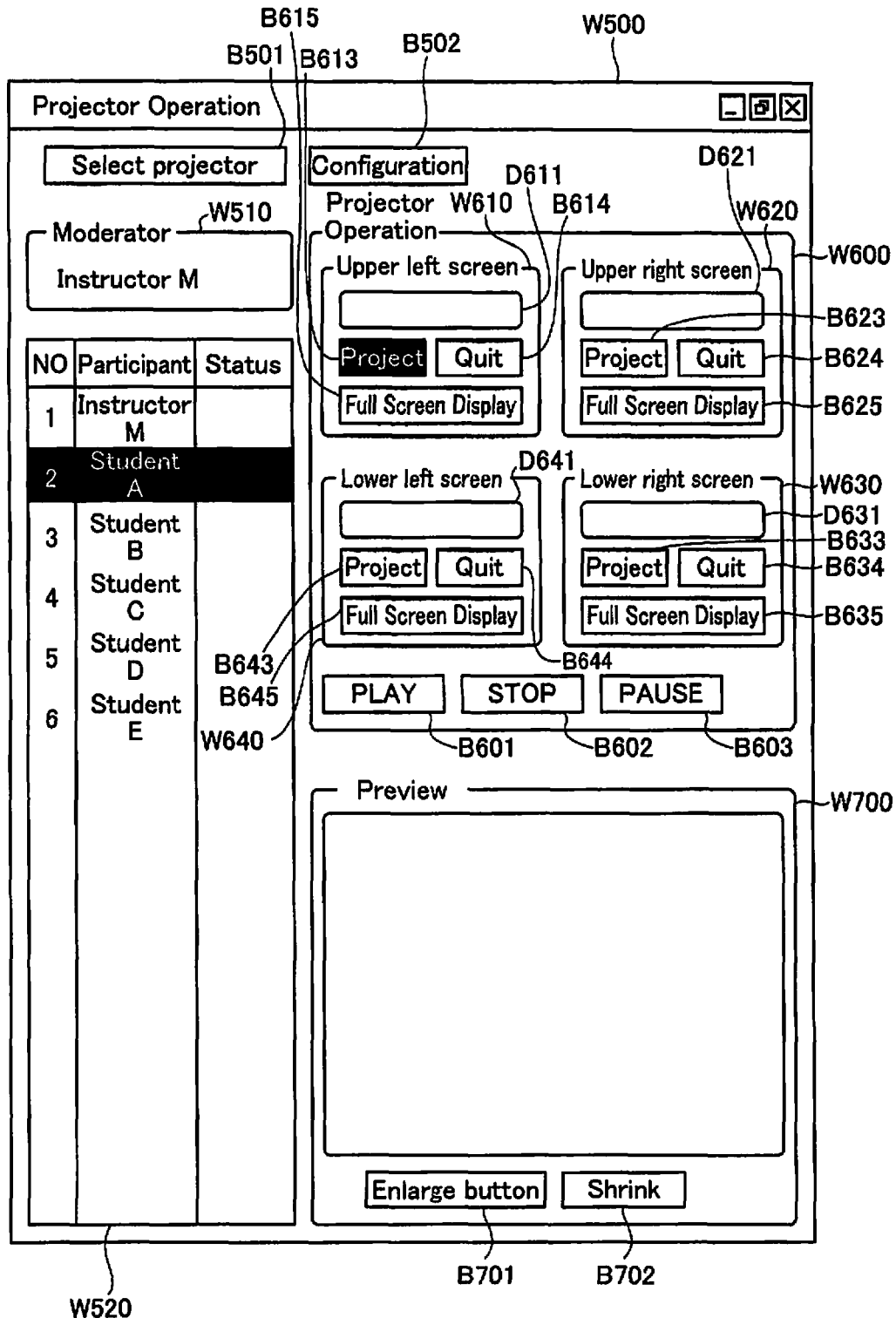
FIG. 12 is an illustration depicting an exemplary Projector Operation window W500 for carrying out projector operation.

Once the projector PR1 and the four-screen display have been selected in the above manner and an OK button B422 has been clicked, the CPU 70, through a process in its capacity as the GUI control module 75, will load from among a number of GUI programs stored on the hard disk drive 80 the GUI program that corresponds to the selected four-screen display, and using the graphics controller 113 will bring up a projector operation window on the display 115. FIG. 12 depicts a Projector Operation window W500 as one example of such a window. The Projector Operation window W500 includes a moderator indicator sub-window W510, a participant indicator sub-window W520, a Projector Operation sub-window W600, and a Preview sub-window W700.

The moderator indicator sub-window W510 shows as the moderator's name the name of the predetermined user of the moderator's computer PCm. Where the moderator's computer PCm is shared among multiple users, the moderator may be prompted to input his or her name at launch of the software application.

The participant indicator sub-window W520 shows a list of computers enabled for projection by the projector PR1, as well as the status of each of these. A projection-enabled computer refers to a computer with which a connection with the moderator's computer PCm was set up in the aforementioned Step S224 and the moderator's computer PCm. In the sub-window W520, the computers are designated by the name of the user of the computer in question, for convenience in identification. Status refers to information indicating whether a computer is currently being projected. In the example in FIG. 12, the moderator indicator sub-window W510 displays the moderator name "Instructor M" and the participant indicator sub-window W520 displays "Student A-E" using computers PC1-PC5. As it is sufficient for the displays of the moderator indicator sub-window W510 and the participant indicator sub-window W520 to uniquely identify the moderator and the participants, computer names or models etc. could be displayed instead.

The Projector Operation sub-window W600 includes an upper left screen sub-window W610, an upper right screen sub-window W620, a lower right screen sub-window W630, and a lower left screen sub-window W640. The reason that four screen sub-windows are provided here is that "four-screen display" was selected from the on-screen display settings sub-window W420 discussed previously; if "two-screen display" had been selected, the number of screen sub-windows would be two, and if "full-screen display" had been selected, the number of screen sub-windows would be one. That is, the number and placement of the screen sub-windows provided in the Projector Operation sub-window W600 will correspond to the split-screen display shown on the screen SC1. In this embodiment, screen sub-windows are associated with a specific number of divided areas and placement thereof within the split-screen display; however, no particular limitation is imposed thereby and sub-windows may instead be associated with various other split-screen display modes. For example, where individual split screen constituent areas making up a split-screen display are shown with screen borders of different colors, the colors of the corresponding screen sub-windows could be associated with the colors of these borders; or where individual split screen constituent areas differ from one another in shape or size, the shape or size of the corresponding screen sub-windows could be associated with the shape or size of these split screen constituent areas.

The upper left screen sub-window W610 includes a projector user indicator field D611; a Project button B613; a Quit button B614; and a Full Screen Display button B615. The projector user indicator field D611 is field that indicates the user of the computer that corresponds to the image for display in the upper left split-screen display area (the split screen constituent area SC11). The Project button B613 and the Quit button B614 are control buttons used to start and stop projecting a prescribed image in the upper left split-screen display area, independently of other split-screen display areas. For example, with "Student A" selected in the participant indicator sub-window W520 as depicted in FIG. 12, by clicking the Project button B613 in the upper left screen sub-window W610, "Student A" can be shown in the projector user indicator field D611, and the on-screen display image PCT1 of the computer PC1 being used by Student A can be displayed in the upper left screen area on the screen SC1, namely, the split screen constituent area SC11. By then clicking the Quit button B614, the "Student A" indication will disappear from the projector user indicator field D611, and the screen display image PCT1 will disappear from the split screen constituent area SC11. In another possible arrangement, the operation of selecting "Student A" from the participant indicator sub-window W520 and assigning the screen display image PCT1 to the split screen constituent area SC11 from the Projector Operation sub-window W600 may be accomplished by dragging and dropping "Student A" into W610 in the participant indicator sub-window W520, rather than clicking on the Project button B613.

The Full Screen Display button B615 is a button used to toggle between the four-screen split-screen display and the full-screen display. For example, if the four-screen split-screen display is currently being displayed on the screen SC1, clicking the Full Screen Display button B615 will toggle the image displayed in the upper left split screen area to full-screen display. Clicking the Full Screen Display button B615 again will toggle back from full-screen display to the original four-screen split-screen display. Since the upper right screen windows W620 -W640 are similar to the upper left screen window 610, they will not be discussed here.

The Projector Operation sub-window W600 includes a PLAY button B601, a STOP button B602, and a PAUSE button B603 for controlling projection operation of the projector PR1. These buttons are used to perform collective operations on images transmitted to the projector PR1 by the moderator's computer PCm, and they permit images projected by the projector PR1 to be played, stopped, or paused through collective operations, regardless of whether the display on the screen SC1 is currently a split-screen display or a full-screen display.

The Preview sub-window W700 is an area that, when any of the Students A-E displayed in the participant indicator sub-window W520 have been selected, provides a preview of the on-screen display image PCT1-PCT5 that corresponds to the selected student, irrespective of the image projected by the projector PR1; it is possible to enlarge or shrink the display using an Enlarge button B701 or a Shrink button B702 provided for this purpose. The preview function may employ, for example, image data of reduced data size that was received from the computers PC1-PC5 by the moderator's computer is PCm sending data transmission requests to the computers PC1-PC5 when the Students A-E are selected from the participant indicator sub-window W520.

The Projector Operation window W500 provided with these sub-windows further includes a Select Projector button B501 and a Configuration button B502. The Select Projector button B501 is a button for selecting a projector and for resetting the on-screen display; clicking this button will bring up the Projector Selection window W400 discussed earlier. Accordingly, by clicking the Select Projector button B501 to bring up the Projector Selection window W400 it will be possible for the Instructor M to select a projector or to modify the on-screen display settings even while the conferencing system 10 is currently in use. The Configuration button B502 is a button for configuring settings such as whether to use the input history to the projector PR1.

Once the Projector Selection window W400 has been brought up by clicking the Select Projector button B501 and the on-screen display settings have been changed in the manner discussed above, the subsequently displayed Projector Operation window W500 will change to reflect these changes. For example, if from the Projector Selection window W400 an operation is performed to switch from four-screen display to two-screen display, the CPU 70 through a process in its capacity as the GUI control module 75 will load from among the GUI programs stored on the hard disk drive 80 the GUI program that corresponds to two-screen display, and will display the Projector Operation window W500 that now includes a Projector Operation sub-window W600 composed of two screen sub-windows. Where, the screen sub-windows have been associated with the display modes of split-screen display color, shape, or size as mentioned above, the Projector Operation sub-window W600 may be modified to reflect the changes in display mode.

In another possible arrangement, the screen sub-windows W610-W640 that make up the Projector Operation sub-window W600 display thumbnails that the CPU 70 has created on the basis of image data for display in the corresponding split-screen display area and stored in the RAM 88. For example, the screen sub-windows W610-W640 may be provided with display fields for displaying the thumbnails, at locations that will not interfere with the buttons etc.; or semitransparent thumbnails created by dimming the luminance signal may be displayed superposed over the buttons etc. This will make it easier to ascertain relationships between split-screen display areas and the screen sub-windows W610-W640, affording simpler operation.

The discussion now returns to Operation 0360. Using the GUI described above, the Instructor M selects "Student A" from the participant indicator sub-window W520, and after confirming the content of the on-screen display image PCT1 displayed in the Preview sub-window W700, clicks the Project button B613 of the upper left screen sub-window W610. In similar fashion, once Students B-D have been selected and the content of the on-screen display images PCT2-4 displayed in the Preview sub-window W700 has been confirmed, the instructor will click the Project button B623-B643 in each of the corresponding upper right screen sub-windows W620-W640. The purpose of this operation is to instruct projection of the screen display images PCT1-PCT4 of the computers PC1-PC4 in a four-screen split-screen display by the projector PR1. These instructions will be handled by the CPU 70 through a process in its capacity as the synthesized image reception module 73.

Once the split-screen display command has been received, the CPU 70 of the moderator's computer PCm will send a sequence of data transmission requests to the computers PC1-PC4 (Step S300).

Meanwhile, upon receipt of the data transmission request sent by the moderator's computer PCm (Step S320), the CPU 20 of each of the computers PC1-PC4, through a process in its capacity as the data transmission module 21, will transmit to the moderator's computer PCm image data of the on-screen display image PCT1-PCT4 displayed on its individual display 65 (Step S321). This image data of the on-screen display images PCT1-PCT4 represents image data (here, RGB image data) that was saved in the RAM 61 of the computer PC1-PC4 at the time that the data transmission request was received, and will be transmitted together with settings information for the graphics controller 63 necessary for the image data to be displayed in image form. Settings information for the graphics controller 63 need not be transmitted if the graphics controller 63 of each of the computers PC1-PC4, the graphics controller 113 of the moderator's computer PCm, and the graphics controller 153 of the projector PR1 have standardized settings.

Meanwhile, upon receipt of transmissions from the computers PC1-PC4, the CPU 70 of the moderator's computer PCm through a process in its capacity as the data communications control module 71 will receive the image data of the on-screen display images PCT1-PCT4 respectively transmitted by the computers PC1-PC4, and save it in the RAM 85 in association with the name of the computer (Step S301).

Through a process in its capacity as the image synthesis module 72 the CPU 70 will then generate in the RAM 85 synthesized image data representing a synthesized image of the on-screen display images PCT1-PCT4 (Step S302).

Once the synthesized image data has been generated, through a process in its capacity as the data communications control module 71 the CPU 70 will transmit the synthesized image data of the on-screen display images PCT1-PCT4 to the projector PR1 (Step S304).

In the projector PR1 meanwhile, through a process in its capacity as the data reception module 121 the CPU 120 will receive the synthesized image data of the on-screen display images PCT1-PCT4, and record it to the VRAM 151. The graphics controller 153 will then read the image data from the VRAM 151 and will project the image onto the screen SC1 using the projection section 155 (Step S340). Thus, as depicted in the left column in FIG. 9, a four-screen split-screen showing the respective on-screen display images PCT1-PCT4 will be displayed on the screen SC1.

Figure 13:
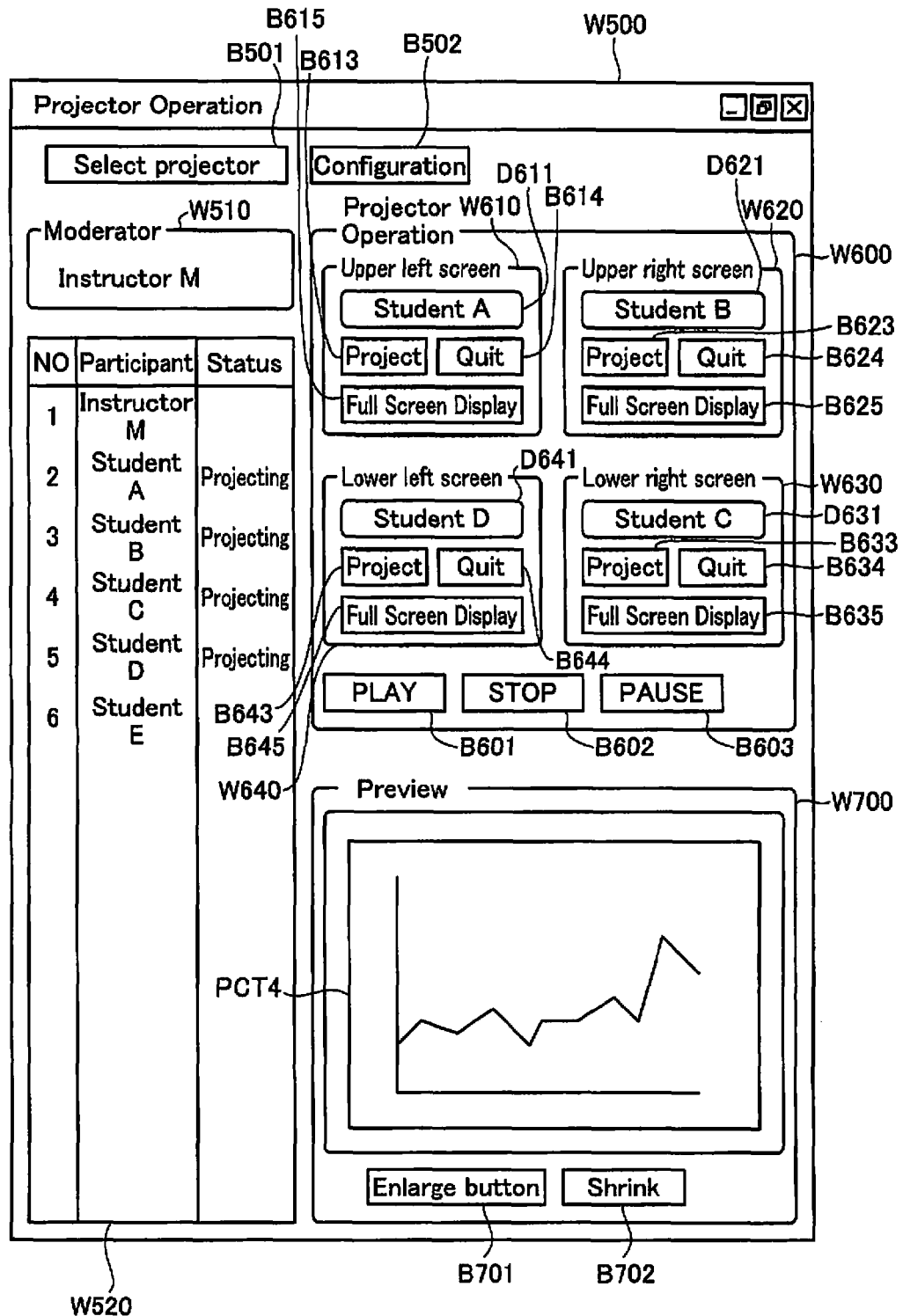
FIG. 13 is an illustration depicting an example display shown during use of the Projector Operation window W500.

At this time, the Projector Operation window W500 discussed above will assume a condition like that depicted in FIG. 13. As illustrated, in the participant indicator sub-window W520, "Currently projecting" status is shown for the Students A-D. In the Projector Operation sub-window W600, "Students A-D" are respectively shown in the projector user indicator fields D611-D641. In the Preview sub-window W700, the on-screen display image PCT4 which corresponds to the last-selected Student D is shown in the participant indicator sub-window W520.

In the aforementioned Step S302 and Step S304, the synthesized image data was transmitted after the CPU 70 has received image data from all of the computers PC1-PCT4 and had generated the synthesized image data; however, generation and transmission of the synthesized image data may take place at prescribed timing intervals as well. In the former instance, the four-screen split-screen display image will appear suddenly on the screen SC1; whereas in the latter instance, the images will be displayed progressively in the course of generating the four-screen split-screen display.

Next, in order to provide a more detailed explanation to the Student A regarding the on-screen display image PCT1, the Instructor M will operate the input system 101 to instruct toggling of the image projected onto the screen SC1 from the four-screen split-screen display image of the on-screen display images PCT1-PCT4 to a full-screen display of the on-screen display image PCT1 of the computer PC1 (Operation 0361). Specifically, from the Projector Operation window W500 displayed on the display 115 of the moderator's computer PCm, the Instructor M will click on the Full Screen Display button B615 of the upper left screen sub-window W610.

Upon receiving this instruction, in the moderator's computer PCm, through a process in its capacity as the image toggling reception module 74 the CPU 70 will receive the instruction; and through a process in its capacity as the data communications control module 71 will transmit the image data of the on-screen display image PCT1 recorded in the RAM 85 in association with the name of the computer PC1 to the projector PR1 (Step S305).

In the projector PR1 meanwhile, the CPU 120 through a process in its capacity as the data reception module 121 will receive the image data of the on-screen display image PCT1 sent by the moderator's computer PCm, and in the same manner as in Step S340 discussed previously, will project the image onto the screen SC1 (Step S341). By so doing, as depicted in the left column of FIG. 9, the on-screen display image PCT1 will be displayed in full-screen display on the screen SC1. By so doing, it will be possible for example for the Student A who is using the computer PC1 to show to the other students the on-screen display image PCT1 which is now displayed prominently on the screen SC1, while at the same time explaining the on-screen display image PCT1 in detail while verifying the content on the display 65 of the computer PCT1.

Next, the Instructor M will project the on-screen display image PCT1 in full-screen display onto the screen SC1, and while the Student A is explaining the on-screen display image PCT1, will control the input system 101 to instruct creation of synthesized image data in which, of the synthesized image data of the screen display images PCT1-PCT4, the on-screen display image PCT5 is interchanged with the on-screen display image PCT2 (Operation O362). Specifically, in the Projector Operation window W500 displayed on the display 115 of the moderator's computer PCm, the Instructor M will click on the Quit button B624 of the upper right screen sub-window W620 that corresponds to the split-screen display area of the on-screen display image PCT2; and then from the participant indicator sub-window W520 will select "Student E" and click on the Project button B823 of the upper right screen sub-window W620. This operation is in preparation for split-screen display of the on-screen display images PCT1, 5, 3, and 4 after explanation of the on-screen display image PCT1 has been completed.

Upon receiving this instruction, the CPU 70 of the moderator's computer PCm, through a process in its capacity as the synthesized image reception module 73, will receive the instruction, and through lookup in the client name profile 82 and the hourly profile 83 will identify the IP address of the other device, and send a data transmission request to the computer PC5 (Step S306).

Meanwhile, upon receipt of the data transmission request sent by the moderator's computer PCm (Step S322), the CPU 20 of the computer PC5 through a process in its capacity as the data transmission module 21 will transmit the image data of the on-screen display image PCT5 currently displayed on the display 65 to the moderator's computer PCm (Step S323). In consideration of the communications load on the local area network LAN, transmission of this image data in Step S323 and Step S321 may take place in a compressed format such as JPEG.

Meanwhile, upon receipt of the transmission from the computer PC5, through a process in its capacity as the data communications control module 71 the CPU 70 of the moderator's computer PCm will receive the image data of the on-screen display image PCT5 sent by the computer PC5, and will save it to the RAM 85 in association with the computer name (Step S307). Through a process in its capacity as the image synthesis module 72, the CPU 70 will generate from the image data of the on-screen display images PCT1, 5, 3, and 4 that was saved in the RAM 85 synthesized image data that represents a synthesized image of the on-screen display images PCT1, 5, 3, and 4, and will record this data to the RAM 85 (Step S308).

Then, once the Student A has finished explaining the on-screen display image PCT1, the Instructor M will control the input system 101 to instruct toggling of the image being projected onto the screen SC1, from full-screen display of the on-screen display image PCT to split-screen display (Operation O363). Specifically, from the Projector Operation window W500 displayed on the display 115 of the moderator's computer PCm, the Instructor M will click on the Full Screen Display button B615 of the upper left screen sub-window W610.

Upon receiving this instruction, the CPU 70 of the moderator's computer PCm, through a process in its capacity as the image toggling reception module 74, will receive the instruction, and then through a process in its capacity as the data communications control module 71 will send to the projector PR1 the synthesized image data of the on-screen display images PCT1, 5, 3, 4 that was recorded in the RAM 85 (Step S310).

Meanwhile, in the projector PR1, through a process in its capacity as the data reception module 121 the CPU 120 will receive the synthesized image data of the on-screen display images PCT1, 5, 3, 4, and in the same manner as in the aforementioned Step S340 and Step S341 will project the image onto the screen SC1 (Step S342). By so doing, as depicted in the left column in FIG. 10, a four-screen split-screen showing the respective on-screen display images PCT1, 5, 3, and 4 will be displayed in the split-screen areas SC11-SC14. This completes the screen toggling process of the embodiment.

In this embodiment, in response to a data transmission request from the moderator's computer PCm, the computers PC1-PC5 will send to the moderator's computer PCm image data recorded in the VRAM 61 at the time that the transmission request was received; however, no limitation to such an arrangement is intended. For example, the computers PC1-PC5 could instead at periodic intervals transmit image data recorded in the VRAM 61 to the moderator's computer PCm. Alternatively, data could be transmitted to the moderator's computer PCm each time that data in the VRAM 61 is updated. With such an arrangement, by updating the image being displayed on the screen SC1 to the most recent image by the method shown in the embodiment each time that the moderator's computer PCm receives the image data, it will be possible for on-screen display images PCT1-PCT5 reflecting changes in the on-screen display images PCT1-PCT5 to be shown on the screen SC1, even s where the on-screen display image PCT1-PCT5 on any of the computers PC1-PC5 has changed, or where the on-screen display image PCT1-PCT5 is a moving image. Where such an arrangement is employed, it will be possible to reduce the traffic load on the local area network LAN by having the computers PC1-PC5 transmit only the updated portion of the data.

While this embodiment has shown an example in which the on-screen display images PCT1-PCT5 are projected onto the screen SC1, it would also be possible to project the on-screen display image PCTm of the moderator's computer PCm through selection by the Instructor M from the participant indicator sub-window W520 of the Projector Operation window W500. In this case, the Instructor M will minimize the Projector Operation window W500 once the desired image data is shown on the display 115.

In this embodiment, the on-screen display images PCT1-PCT5 of the computers PC1-PC5 constitute the images for projection onto the screen SC1, but no limitation is intended thereby and it would be acceptable to display any other image handled by the computers PC1-PC5. For example, if the computers PC1-PC5 are equipped with webcams, images taken thereby could be projected. Alternatively, it would be possible to project any specified image from among image data stored on the computers, rather than the current display on the display 65 of each of the computers PC1-PC5.

In this embodiment, a projector was described by way of the image display device included in the conferencing system 10, but various other types of display devices, such as a plasma display, liquid crystal display, organic EL display or the like could be used as well. Also, while by way of example the computers PC1-PC5 were described as the terminals included in the conferencing system 10, the terminals could be composed of various other kinds of communications terminals such as mobile phones, PDAs (Personal Digital Assistant), and so on.

In this embodiment, the moderator's computer PCm functioned as the server for receiving image data from the computers PC1-PC5, generating synthesized images, transmitting these the projector PR1 and so on; however, the moderator's computer PCm operated by the Instructor M and the server may be provided as separate devices. This can reduce the load on the moderator's computer PCm, and enhance the usage capabilities of the moderator's computer PCm. In such a case, the hourly profiles saved on the hard disks 30 of the computers PC1-PC5, as well as the hourly profile 83 and the class makeup profile 84 stored on the hard disk 80 of the moderator's computer PCm, may be managed by the server instead. This will enable the schedules of the Instructor M and the Students A-E, the makeup of each class, and so on to be managed in an integrated fashion, making management easier.

Using image data of images handled by the computers PC1-PC5 and received by the moderator's computer PCm from the computers PC1-PC5, as well as image data of images handled by the moderator's computer PCm, the conferencing system 10 of the above configuration generates synthesized image data and transmits the data to the projector PR1. Consequently, the projector PR1 can display a synthesized image simply by displaying the synthesized image data it has received. That is, utilizing an existing projector PR1 that lacks any special split-screen display functionality, it is possible for images handled by the computers PC1-PC5 and by the moderator's computer PCm which are connected on the local area network LAN to be displayed as a single split-screen display. Additionally, through simple operation using the moderator's computer PCm, the operator of the moderator's computer PCm will be able to display desired images from his or her own computer as well, without the need to operate a separate terminal.

The conferencing system 10 can switch the image data transmitted to the projector PR1 by the data communications control module 71 of the moderator's computer PCm between synthesized image data, and image data handled by any of the computers PC1-PC5 or by the moderator's computer PCm. Consequently, users will be able to conference while displaying a synthesized image, an image handled by any of the computers PC1-PC5, or an image handled by the moderator's computer PCm, as conditions warrant.

During the time that any of the on-screen display images PCT1-PCT5 or PCTm are being projected in full-screen display on the screen SC1, the conferencing system 10 of the above configuration can generate desired synthesized images through operation of the moderator's computer PCm, and once generation of the image is finished can toggle the display on the screen SC1 from full-screen display to split-screen display in order to display the image of the synthesized image data thusly created; accordingly, during switching between screens, it will be possible to avoid unnecessary wait time for the synthesized image data to be generated and displayed, so the discussion can continue uninterrupted. The conference may therefore proceed smoothly.

C. Alternative Embodiment:

An alternative embodiment of the present invention will now be described. A point of difference from the preceding embodiment is that the moderator's computer PCm is provided with a unit for receiving an instruction to transmit image data to the projector PR1, and a unit for alerting the user of the moderator's computer PCm when generation of the synthesized image is done. This difference will be discussed in detail below.

Figure 14:
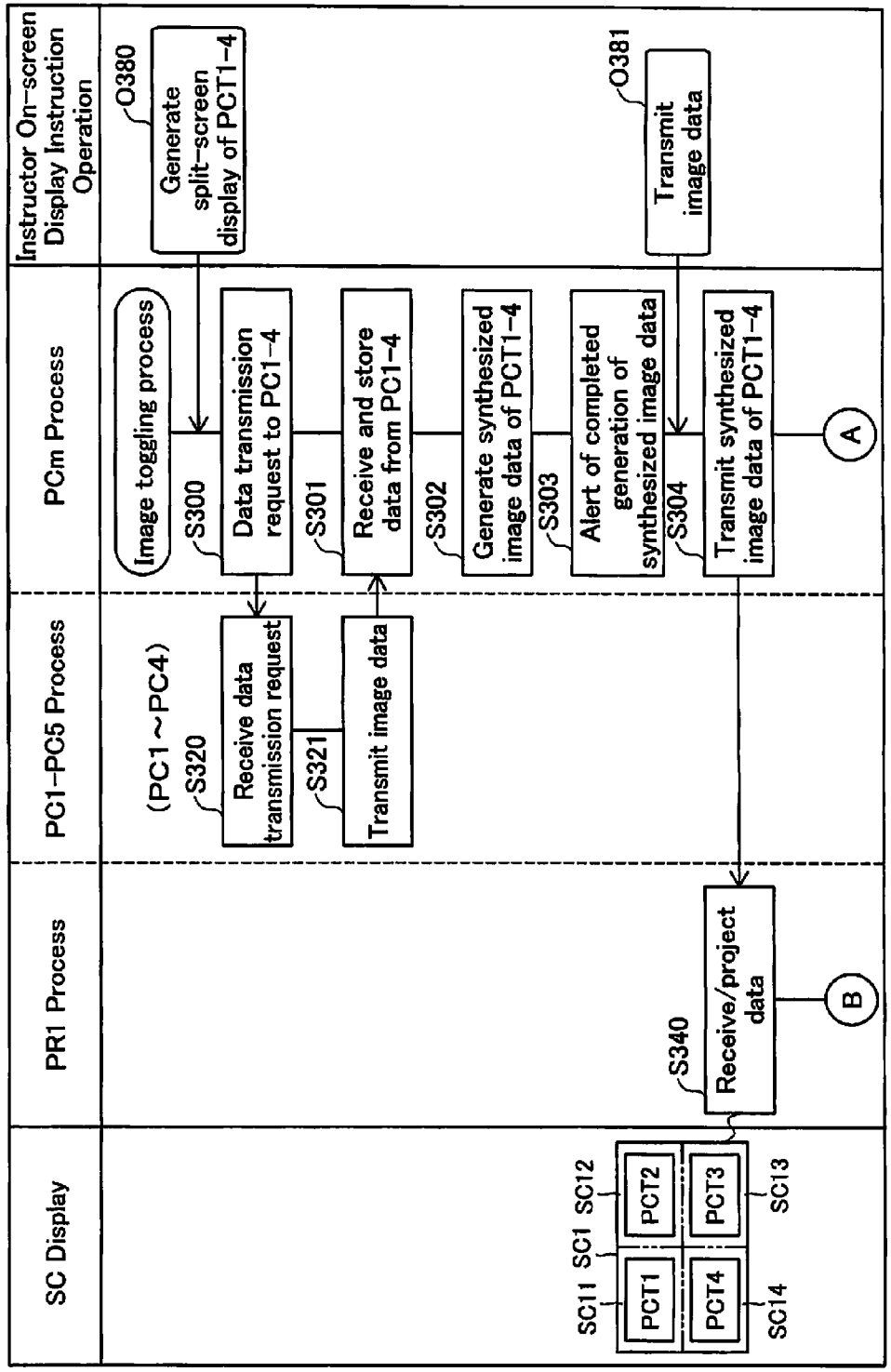
FIG. 14 is an illustration depicting by way of an alternative embodiment an exemplary flow of a split-screen display switching process for switching on-screen display using the conferencing system 10.
Figure 15:
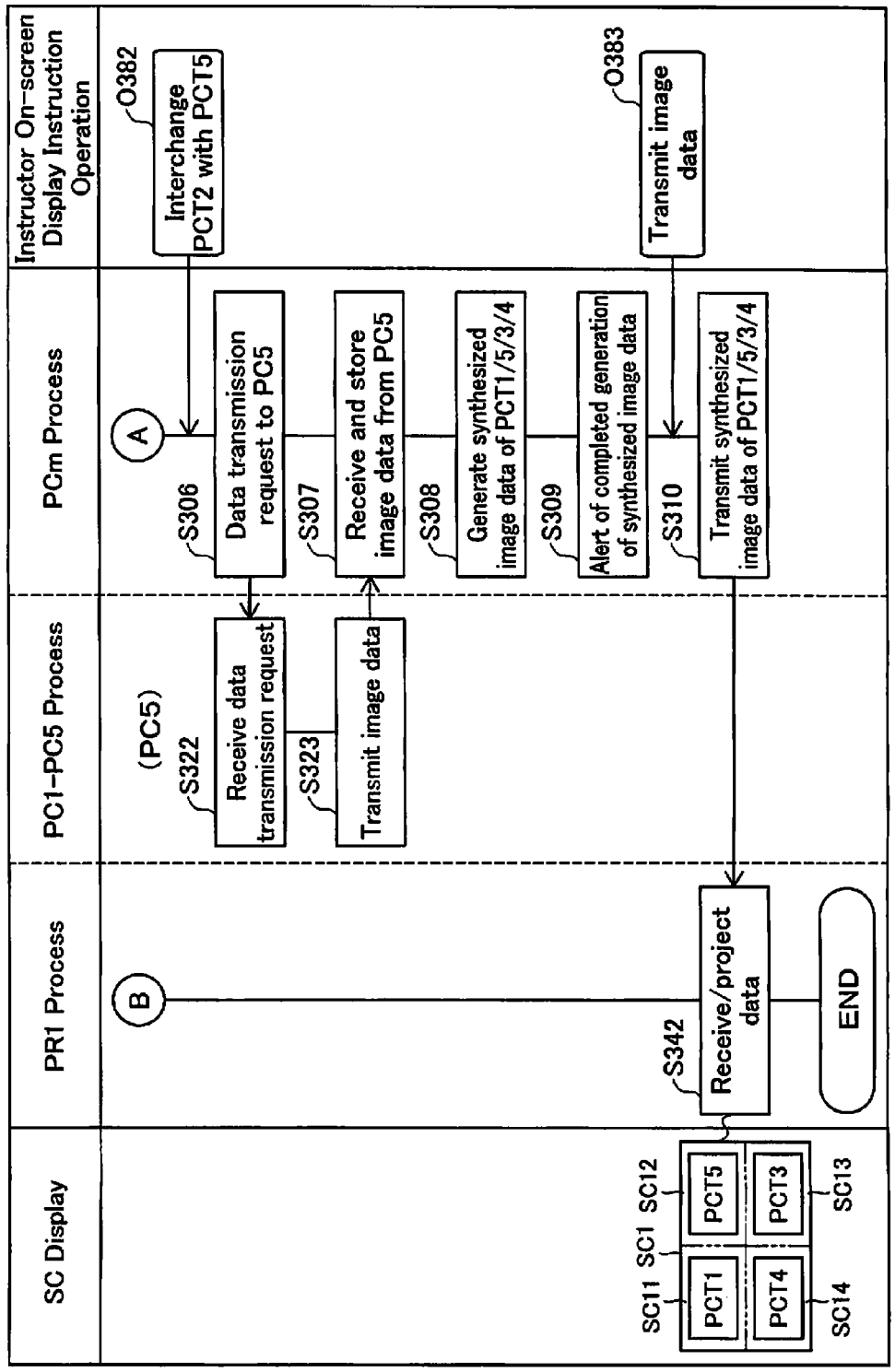
FIG. 15 is an illustration depicting by way of an alternative embodiment an exemplary flow of a split-screen display switching process for switching on-screen display using the conferencing system 10.

FIG. 14 and FIG. 15 are illustrations depicting exemplary flow of a split-screen display toggling process in the alternative embodiment. In FIG. 14 and FIG. 15, process steps comparable to those in the embodiment have been assigned the same symbols as in the embodiment, and are not discussed in any detail. This process will be initiated when the Instructor M instructs the moderator's computer PCm to generate synthesized image data that represents the on-screen display images PCT1-PCT4 of the computers PC1-PC4 as a four-screen split-screen display image (Operation O380). While the Operation O360 in the embodiment was an operation for instructing both generation and transmission of synthesized image data, this operation differs from the Operation O360 in that it instruct only generation of the synthesized image data.

Figure 16:
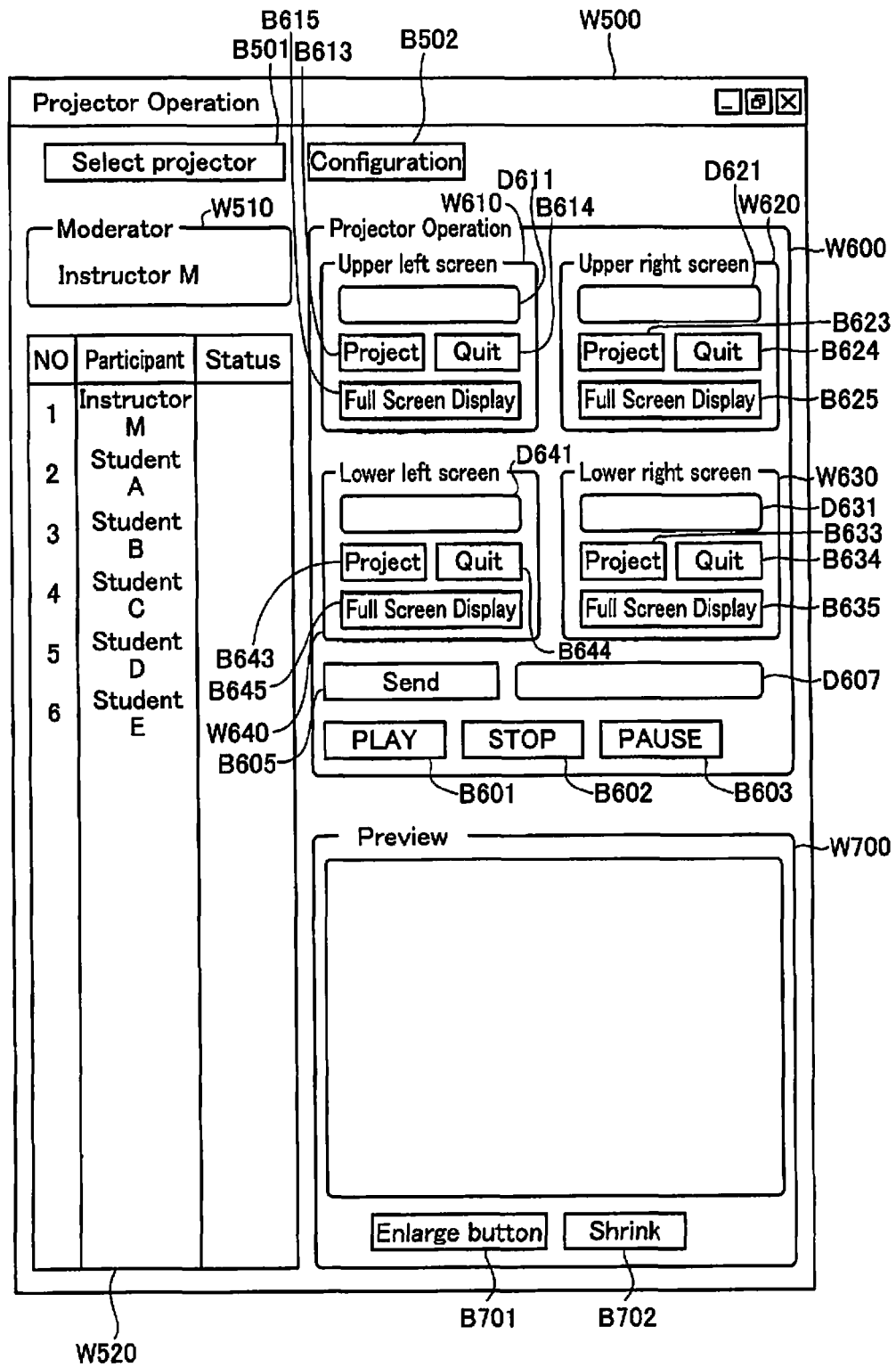
FIG. 16 is an illustration depicting an exemplary Projector Operation window W500 in an alternative embodiment.

The above Operation O380 is carried out through a method comparable to the Operation O360 in the embodiment. However, the GUI employed in this alternative embodiment has a few differences from that in the previous embodiment. A specific example of the Projector Operation window W500 employed in the alternative embodiment is depicted in FIG. 16. A point of difference from the embodiment is that the Projector Operation sub-window W600 included in the Projector Operation window W500 has a Send button B605 and a completed image synthesis indicator field D607. These will be discussed in detail later.

When an instruction to generate synthesized image data is received, the CPU 70 will receive image data from the computers PC1-PC4, and will generate synthesized image data of the on-screen display images PCT1-PCT4 (Steps S300-S302, S320, 321). When generation of the synthesized image data is finished, through a process in its capacity as the completed synthesis alert module 78 the CPU 70 will alert the user of the moderator's computer PCm, i.e. the Instructor M, when generation of the synthesized image data is done (Step S303). Specifically, the message "Image Synthesis Done" will appear in the completed image synthesis indicator field D607, for example.

Having ascertained through the aforementioned Step S303 that generation of the synthesized image data is finished, the Instructor M will now use the input system 101 to click on the Send button B605 and instruct that the synthesized image data so generated be sent to the projector PR1 (O381).

Upon receiving this Send instruction, through a process in its capacity as the transmission instruction reception module 77 the CPU 70 of the moderator's computer PCm will transmit the generated synthesized image data to the projector PR1 for display of the on-screen display images PCT1-PCT4 in four-screen split-screen display (Steps S304, S340).

In other words, a significant difference of these processes from those of the embodiment is that no image data will be transmitted to the projector PR1 until the CPU 70 in its capacity as the transmission instruction reception module 77 receives the Send instruction.

Next, the Instructor M will instruct the moderator's computer PCm to create, from the synthesized image data of the on-screen display images PCT1-PCT4, synthesized image data in which the on-screen display image PCT2 is replaced by the on-screen display image PCT5 (Operation O382). Upon receiving this instruction, the CPU 70 of the moderator's computer PCm will receive the image data of the on-screen display image PCT5 from the computer PC5, and generate synthesized image data representing a synthesized image of the on-screen display images PCT1, 5, 3, and 4 (Steps S306-S308, S322, S323).

Once generation of the synthesized image data is finished, through a process in its capacity as the completed synthesis alert module 78, the CPU 70 will alert the user of the moderator's computer PCm, i.e. the Instructor M, of the fact that generation of the synthesized image data is done (Step S309). As in the aforementioned Step S303, the completed image synthesis indicator field D607 can be used as the specific method of alert.

Having ascertained through the aforementioned Step S309 that generation of the synthesized image data is finished, the Instructor M will now use the input system 101 to click on the Send button B605 and instruct that the synthesized image data so generated be sent to the projector PR1 (O383).

Upon receiving this Send instruction, through a process in its capacity as the transmission instruction reception module 77, the CPU 70 of the moderator's computer PCm will transmit the generated synthesized image data to the projector PR1 for display of the on-screen display images PCT1, 5, 3, and 4 in four-screen split-screen display (Steps S310, S342).

In this embodiment, the completed image synthesis indicator field D607 of the Projector Operation sub-window W600 is employed as the unit by which the CPU 70 notifies the Instructor M when generation of synthesized image data is done; however, no limitation to this particular mode is intended. For example, the CPU 70 could instead look up in the RAM 88 and display the generation conditions of the synthesized image data in the Preview sub-window W700. With such a mode as this as well, the Instructor M can be apprised when generation of the synthesized image data is done.

In the conferencing system 10 having the above configuration, the moderator's computer PCm will transmit display data only upon receiving an instruction to transmit image data to the projector PR1. Consequently, synthesized image data representing a new split-screen display (e.g. on-screen display images PCT1, 5, 3, 4) can be generated through a process separate from the previous display, while the projector PR1 is still displaying the previous prescribed split-screen display (e.g. in-screen display images PCT1-PCT4). Then, after generation of the new display is finished, once an instruction to send the synthesized image data to the projector PR1 is received, when toggling from the previous prescribed split-screen display to the new split-screen display it will be possible to avoid unnecessary wait time before the synthesized image data is generated and displayed. Such advantages will be particularly significant in cases where the new split-screen display contains a large number of split screens; where some time is needed to generate the synthesized image data owing to the large size of the image data for display; or where factors such as traffic conditions on the local area network LAN result in slow communication speeds between the moderator's computer PCm and the computers PC1-PC5.

In the conferencing system 10 having the above configuration, since the moderator's computer PCm alerts the user of the moderator's computer PCm when generation of the synthesized image data is finished, the user of the moderator's computer PCm can switch the display image after being apprised that generation of the synthesized image data is finished. Consequently, when switching between display images, it will be possible to make this switch while accurately estimating the timing in such a way as to avoid unnecessary wait time to generate and display the image data.

While the present invention has been described herein through certain preferred embodiments, it is to be understood that the present invention is in no way limited thereby and can be reduced to practice in other modes without departing from the spirit and scope of the invention. For example, besides the conferencing system set forth above, the invention can be worked in other modes such as a server, an image display method, a computer program, or a recording medium.

Several such other modes of working the invention will be described below. One such mode is a conferencing system as set forth above, wherein the terminals are composed of a plurality of terminals; the reception unit receives terminal image data from at least two of the plurality of terminals; and the other image includes an image represented by at least one set of image data from among the received terminal image data from at least two terminals.

With a conferencing system having this configuration, since the terminals are composed of multiple terminals, and the reception unit receives respective terminal image data from at least two terminals among the plurality of terminals, images handled by the plurality of terminals can be displayed in a single split-screen display.

Alternatively, the other image may include an image handled by the server. In a conferencing system having this configuration, an image handled by a terminal and an images handled by the server can be displayed a single split-screen display. Consequently, through simple operation using the server, the user of the server will be able to display a desired image from his or her own computer as well, without the need to operate a separate terminal.

Furthermore, in another possible configuration for the conferencing system, the second transmission unit may include a switching unit that switches the transmitted data for display from the synthesized image data to the terminal image data received by the reception unit, or to server image data representing an image handled by the server.

With a conferencing system having this configuration, since the second transmission unit includes a switching unit for switching the transmitted display data from the synthesized image data to the terminal image data or to server image data, users can conference while displaying either a synthesized image, a terminal image, or a server image as conditions warrant.

The server may further include a first reception unit that receives an instruction to switch the data for display; and the second transmission unit may switch the data for display on the basis of an instruction received by the first reception unit.

With a conferencing system having this configuration, the server receives an instruction to switch the data for display, and switched the data for display depending on this instruction. Consequently, the user can toggle among displayed images as conditions of the conference warrant, and the conference can proceed smoothly and in a highly flexible manner.

In such a conferencing system, the image synthesis unit may generate new synthesized image data when the second transmission unit has is switched the data for display from the synthesized image data to the terminal image data or to the server image data.

With a conferencing system having this configuration, new synthesized image data will be generated when the data for display has been switched from synthesized image data to terminal image data or to server image data. Consequently, during the time that the image display device is displaying the terminal image or the server image, new synthesized image data can be generated; and once generation thereof is finished, by then switching the data for display to the new synthesized image and displaying the new synthesized image, it will be possible to avoid unnecessary wait time for generating and displaying the synthesized image data when the display image is switched.

Alternatively, the server may further include a second reception unit that receives an instruction to transmit the data for display to the image display device; and the second transmission unit may transmit the data for display on the basis of an instruction received by the second reception unit.

With a conferencing system having this configuration, the server receives an instruction to transmit data for display to an image display device, and transmits the data for display on the basis of this instruction. Consequently, during the time that prescribed synthesized image data is being transmitted to image display device as data for display and the synthesized image is being displayed on the image display device, new synthesized image data can be generated; and once generation thereof is finished, by then issuing an instruction to transmit the new synthesized image data to the image display device as data for display, it will be possible to avoid unnecessary wait time for generating and displaying the synthesized image data when the display image is switched.

Furthermore, the server may further include a unit that alerts the user of the server when generation of the synthesized image data by the synthesis unit is complete.

With a conferencing system having this configuration, the user of the server will be alerted that generation of the synthesized image data by the synthesis unit is finished, and thus the user of the server will be able to switch the displayed image upon confirming that generation of the synthesized image data is finished. Consequently, when switching between display images, it will be possible to make the switch while accurately estimating the timing in such a way as to avoid unnecessary wait time to generate and display the image data.

Additionally, in this conferencing system, the server may further include a third reception unit that receives an instruction to specify images for making up a synthesized image; and the image synthesis unit may generate the synthesized image data on the basis of an instruction received by the third reception unit.

With a conferencing system having this configuration, the server receives an instruction to specify images for inclusion in the synthesized image, and on the basis of the instruction generates synthesized image data. Consequently, the user can toggle among displayed images as conditions of the conference warrant, and the conference can proceed smoothly and in a highly flexible manner.

The image handled by the terminal may be an image that is displayed on a display screen provided to the terminal. With a conferencing system having this configuration, since an image displayed on the display screen provided to the terminal can be displayed, the user of a terminal can explain displayed content on the image display device while verifying the display screen of the terminal in question.

The present invention shall in no wise be construed as limited to the embodiments and modes set forth herein, and the scope of the invention shall be determined by the appended claims and core technological features of the invention.

What is claimed is:

1. A conferencing system comprising:
    a first terminal that includes a first display screen, and transmits first terminal image data representing an image that is displayed on the first display screen;
    a second terminal that includes a second display screen, and transmits second terminal image data representing an image that is displayed on the second display screen;
    a server, that includes a server display screen, receives the first terminal image data and the second terminal image data transmitted from the first terminal and the second terminal, generates synthesized image data by synthesizing together the first terminal image data and the second terminal image data, and selectively transmits at least one of the synthesized image data, the first terminal image data, the second terminal image data, and server image data to a projector, wherein the server image data represents an image that is displayed on the server display screen and does not include the first terminal image data or the second terminal image data; and the projector that receives the at least one of the synthesized image data, the first terminal image data, the second terminal image data, and the server image data, and displays an image based on the at least one of the synthesized image data, the first terminal image data, the second terminal image data, and the server image data, wherein:

the first terminal image data received by the server is updated when the image that is displayed on the first display screen is changed, the second terminal image data received by the server is updated when the image that is displayed on the second display screen is changed, and the synthesized image data generated by the server is updated when either the first terminal image data or the second terminal image data received by the server is updated.

2. The conferencing system in accordance with claim 1, wherein the synthesized image further includes an image handled by the server.

3. The conferencing system in accordance with claim 1, wherein the server further includes a first reception unit that receives an instruction to switch the data for display; and the server includes a second transmission unit that switches the data for display on the basis of an instruction received by the first reception unit.

4. The conferencing system in accordance with claim 1, wherein the server includes an image synthesis unit that generates new synthesized image data when a second transmission unit has switched the data for display from the synthesized image data to at least one of the first terminal image data, the second terminal image data, and the server image data.

5. The conferencing system in accordance with claim 1, wherein the server further includes a second reception unit that receives an instruction to transmit the data for display to the image display device; and the server includes a second transmission unit that transmits the data for display on the basis of an instruction received by the second reception unit.

6. The conferencing system in accordance with claim 1, wherein the server further includes a unit that alerts the user of the server when generation of the synthesized image data by a synthesis unit is complete.

7. The conferencing system in accordance with claim 1, wherein the server further includes a third reception unit that receives an instruction to specify images for inclusion in the synthesized image; and an image synthesis unit generates the synthesized image data on the basis of an instruction received by the third reception unit.

8. An image display method adapted to produce, on an image projected by a projector, a display of a first image that is handled by a first terminal and a second image that is handled by a second terminal, the method comprising:

receiving first terminal image data transmitted from the first terminal and second terminal image data transmitted from the second terminal, the first terminal image data transmitted from the first terminal representing an image that is displayed on a first display screen of the first terminal and the second terminal image data transmitted from the second terminal representing an image that is displayed on a second display screen of the second terminal;

generating synthesized image data by synthesizing together the first terminal image data and the second terminal image data, selectively transmitting at least one of the synthesized image data, the first terminal image data, the second terminal image data, and server image data to a projector, wherein the server image data represents an image that is displayed on a server display screen of a server and does not include the first terminal image data or the second terminal image data, updating the first terminal image data when the image that is displayed on the first display screen is changed, updating the second terminal image data when the image that is displayed on the second display screen is changed, and updating the synthesized image data when either the first terminal image data or the second terminal image data is updated.

9. A server comprising:

a server display screen, wherein the server receives first terminal image data transmitted from a first terminal that includes a first display screen, the first terminal image data representing an image that is displayed on the first display screen, receives second terminal image data transmitted from a second terminal that includes a second display screen, the second terminal image data representing an image that is displayed on the second display screen, generates synthesized image data by synthesizing together the first terminal image data and the second terminal image data, and selectively transmits at least one of the synthesized image data, the first terminal image data, the second terminal image data, and server image data to a projector that receives the at least one of the synthesized image data, the first terminal image data, the second terminal image data, and the server image data and displays an image based on the at least one of the synthesized image data, the first terminal image data, the second terminal image data, and the server image data, wherein the server image data represents an image that is displayed on the server display screen and does not include the first terminal image data or the second terminal image data, wherein:

the first terminal image data received by the server is updated when the image that is displayed on the first display screen is changed, the second terminal image data received by the server is updated when the image that is displayed on the second display screen is changed, and the synthesized image data generated by the server is updated when either the first terminal image data or the second terminal image data received by the server is updated.

10. A computer program product stored on a non-transitory computer-readable storage medium, the computer program product comprising:

a first program code for receiving, at a server, first terminal image data transmitted from a first terminal that includes a first display screen, the first terminal image data representing an image that is displayed on the first display screen, a second program code for receiving, at the server, second terminal image data transmitted from a second terminal that includes a second display screen, the second terminal image data representing an image that is displayed on the second display screen, a third program code for generating synthesized image data by synthesizing together the first terminal image data and the second terminal image data, a fourth program code for selectively transmitting at least one of the synthesized image data, the first terminal image data, the second terminal image data, and server image data to a projector that receives the at least one of the synthesized image data, the first terminal image data, the second terminal image data, and the server image data and displays an image based on the at least one of the synthesized image data, the first terminal image data, the second terminal image data, and the server image data, wherein the server image data represents an image that is displayed on a server display screen of the server and does not include the first terminal image data or the second terminal image data, and a fifth program code for updating the first terminal image data received by the server when the image that is displayed on the first display screen is changed, updating the second terminal image data received by the server when the image that is displayed on the second display screen is changed, and updating the synthesized image data generated by the server when either the first terminal image data or the second terminal image data received by the server is updated.

* * * * *